(12) United States Patent
Bellan et al.

(10) Patent No.: US 9,807,054 B2
(45) Date of Patent: Oct. 31, 2017

(54) METHOD AND SYSTEM FOR ADVANCED ALIAS DOMAIN ROUTING

(71) Applicant: NextPlane, Inc., Sunnyvale, CA (US)

(72) Inventors: Saravanan Bellan, San Jose, CA (US); Sanjay M. Pujare, San Jose, CA (US); Farzin Khatib Shahidi, Los Altos Hills, CA (US); Yogesh Raina, Cupertino, CA (US); Silvia Restelli, San Jose, CA (US)

(*) Notice: Subject to any disclaimer, the term of this patent is extended or adjusted under 35 U.S.C. 154(b) by 0 days.

(21) Appl. No.: 14/954,826

(22) Filed: Nov. 30, 2015

(65) Prior Publication Data

US 2016/0156589 A1 Jun. 2, 2016

Related U.S. Application Data

(63) Continuation of application No. 13/153,025, filed on Jun. 3, 2011, now Pat. No. 9,203,799, which is a
(Continued)

(51) Int. Cl.
*G06F 15/16* (2006.01)
*H04L 29/12* (2006.01)

(52) U.S. Cl.
CPC ........ *H04L 61/307* (2013.01); *H04L 61/2575* (2013.01); *H04L 61/2589* (2013.01); *H04L 61/2596* (2013.01)

(58) Field of Classification Search
CPC ... H04L 61/30; H04L 61/307; H04L 61/2596; H04L 61/2575; H04L 61/2589
(Continued)

(56) References Cited

U.S. PATENT DOCUMENTS

| 5,784,612 A | 7/1998 | Crane et al. |
| 6,041,281 A | 3/2000 | Nimura et al. |

(Continued)

FOREIGN PATENT DOCUMENTS

| EP | 1549024 | 6/2005 |
| WO | WO0239237 | 5/2002 |
| WO | 2015054522 A1 | 4/2015 |

OTHER PUBLICATIONS

Bossoli, Francesca, et al.; "Proposal for Common Interoperability Protocol", Online, Aug. 30, 2003, pp. 1-3, XP002283230.
(Continued)

*Primary Examiner* — Kenneth R Coulter
(74) *Attorney, Agent, or Firm* — Steptoe & Johnson LLP

(57) ABSTRACT

A method and system for advanced alias domain routing are disclosed. According to one embodiment, a computer implemented method comprises receiving an incoming message from a first unified communications server, the incoming message comprising source address data, destination address data, and digital content. A real address of a destination address is computed by using the source address data, and an alias address of a source address is computed by using the destination address data. The incoming message is processed, wherein processing the incoming message includes enforcing policies. An outgoing message is generated comprising the digital content, the real address and the alias address. The outgoing message is transmitted to a second unified communications server.

13 Claims, 30 Drawing Sheets

Related U.S. Application Data continuation-in-part of application No. 13/077,710, filed on Mar. 31, 2011, now Pat. No. 9,077,726.

(58) Field of Classification Search
USPC .......... 709/245, 203, 204–206; 715/751–759
See application file for complete search history.

(56) References Cited

U.S. PATENT DOCUMENTS

| | | | |
|---|---|---|---|
| 6,065,016 | A | 5/2000 | Stuntebeck et al. |
| 6,208,986 | B1 | 3/2001 | Schneck et al. |
| 6,298,128 | B1 | 10/2001 | Ramey et al. |
| 6,418,200 | B1 | 7/2002 | Ciccolella |
| 6,463,056 | B1 | 10/2002 | Silva et al. |
| 6,591,291 | B1 | 7/2003 | Gabber et al. |
| 6,654,759 | B1 | 11/2003 | Brunet et al. |
| 6,665,378 | B1 | 12/2003 | Spielman et al. |
| 6,738,462 | B1 | 5/2004 | Brunson |
| 6,892,245 | B1 | 5/2005 | Crump et al. |
| 6,970,553 | B1 | 11/2005 | Gao et al. |
| 7,051,114 | B1 | 5/2006 | Ravishankar et al. |
| 7,269,432 | B2 * | 9/2007 | Gress ............... H04L 12/5835 455/414.1 |
| 7,443,961 | B2 | 10/2008 | Schroeder et al. |
| 7,558,827 | B2 * | 7/2009 | Kawashima ............ H04L 51/28 709/206 |
| 7,577,132 | B2 | 8/2009 | Katz et al. |
| 7,697,924 | B2 | 4/2010 | Caspi et al. |
| 7,698,398 | B1 | 4/2010 | Lai |
| 7,706,266 | B2 | 4/2010 | Plamondon |
| 7,739,333 | B2 | 6/2010 | Serr et al. |
| 7,953,979 | B2 | 5/2011 | Borneman et al. |
| 8,145,719 | B2 | 3/2012 | Barman et al. |
| 8,200,758 | B2 | 6/2012 | Serr et al. |
| 8,359,357 | B2 | 1/2013 | Rodriguez et al. |
| 8,380,661 | B2 | 2/2013 | Richards et al. |
| 9,077,726 | B2 * | 7/2015 | Pujare ..................... H04L 69/08 |
| 9,203,799 | B2 * | 12/2015 | Bellan ................ H04L 61/2575 |
| 9,241,012 | B2 | 1/2016 | De Castro, Jr. et al. |
| 2002/0037074 | A1 | 3/2002 | Dowens et al. |
| 2002/0083183 | A1 | 6/2002 | Pujare et al. |
| 2002/0087704 | A1 | 7/2002 | Chesnais et al. |
| 2002/0124057 | A1 | 9/2002 | Besprosvan |
| 2002/0157089 | A1 | 10/2002 | Patel et al. |
| 2003/0018725 | A1 | 1/2003 | Turner et al. |
| 2003/0149781 | A1 | 8/2003 | Yared et al. |
| 2004/0083297 | A1 | 4/2004 | Gazzetta et al. |
| 2005/0022006 | A1 | 1/2005 | Bass et al. |
| 2005/0047438 | A1 | 3/2005 | Sylvain |
| 2005/0102513 | A1 | 5/2005 | Alve |
| 2005/0175021 | A1 | 8/2005 | Ozugur et al. |
| 2005/0288961 | A1 | 12/2005 | Tabrizi |
| 2006/0021017 | A1 | 1/2006 | Hinton et al. |
| 2006/0021019 | A1 | 1/2006 | Hinton et al. |
| 2006/0053384 | A1 | 3/2006 | La Fetra, Jr. et al. |
| 2006/0128409 | A1 * | 6/2006 | Gress ............... H04L 12/5835 455/466 |
| 2006/0136990 | A1 | 6/2006 | Hinton et al. |
| 2006/0205434 | A1 | 9/2006 | Tom et al. |
| 2006/0230124 | A1 | 10/2006 | Belfiore et al. |
| 2007/0011245 | A1 * | 1/2007 | Kawashima ............ H04L 51/28 709/206 |
| 2007/0130343 | A1 | 6/2007 | Pardo-Blazquez et al. |
| 2007/0136603 | A1 | 6/2007 | Kuecuekyan |
| 2007/0202897 | A1 | 8/2007 | Smith |
| 2007/0234417 | A1 | 10/2007 | Blakley, III et al. |
| 2007/0285503 | A1 | 12/2007 | Asthana et al. |
| 2008/0010665 | A1 | 1/2008 | Hinton et al. |
| 2008/0021997 | A1 | 1/2008 | Hinton |
| 2008/0032695 | A1 | 2/2008 | Zhu et al. |
| 2008/0072301 | A1 | 3/2008 | Chia et al. |
| 2008/0082662 | A1 | 4/2008 | Dandliker et al. |
| 2008/0086465 | A1 | 4/2008 | Fontenot et al. |
| 2008/0086564 | A1 | 4/2008 | Putman et al. |
| 2008/0144896 | A1 | 6/2008 | Burke |
| 2008/0215694 | A1 | 9/2008 | Chen et al. |
| 2008/0215717 | A1 | 9/2008 | Zhou et al. |
| 2008/0219223 | A1 | 9/2008 | Bienas et al. |
| 2008/0320576 | A1 | 12/2008 | Curling |
| 2009/0019115 | A1 | 1/2009 | Larson et al. |
| 2009/0019367 | A1 | 1/2009 | Cavagnari et al. |
| 2009/0049190 | A1 | 2/2009 | Jiang et al. |
| 2009/0049202 | A1 | 2/2009 | Pattison et al. |
| 2009/0077251 | A1 | 3/2009 | Brown et al. |
| 2009/0089625 | A1 | 4/2009 | Kannappan et al. |
| 2009/0094336 | A1 | 4/2009 | Echevarria et al. |
| 2009/0100289 | A1 | 4/2009 | Chen et al. |
| 2009/0119763 | A1 | 5/2009 | Park et al. |
| 2009/0138615 | A1 | 5/2009 | Cristallo et al. |
| 2009/0150905 | A1 | 6/2009 | Lin et al. |
| 2009/0172776 | A1 | 7/2009 | Makagon et al. |
| 2009/0177735 | A1 | 7/2009 | Algie et al. |
| 2009/0180602 | A1 | 7/2009 | Ramanathan et al. |
| 2009/0210496 | A1 | 8/2009 | Shaffer et al. |
| 2009/0276840 | A1 | 11/2009 | Cao et al. |
| 2009/0292814 | A1 | 11/2009 | Ting et al. |
| 2009/0307327 | A1 | 12/2009 | Malik et al. |
| 2009/0319672 | A1 | 12/2009 | Reisman |
| 2009/0327419 | A1 | 12/2009 | Serr et al. |
| 2009/0327441 | A1 | 12/2009 | Lee et al. |
| 2009/0327868 | A1 | 12/2009 | Tsukikawa |
| 2010/0017598 | A1 | 1/2010 | Rodriguez et al. |
| 2010/0057851 | A1 | 3/2010 | Ionescu et al. |
| 2010/0058120 | A1 | 3/2010 | Coleman et al. |
| 2010/0100925 | A1 | 4/2010 | Hinton |
| 2010/0162374 | A1 | 6/2010 | Nair |
| 2010/0205664 | A1 | 8/2010 | Serr et al. |
| 2010/0223334 | A1 | 9/2010 | Narayanan et al. |
| 2010/0251158 | A1 | 9/2010 | Geppert et al. |
| 2010/0287226 | A1 | 11/2010 | Wright et al. |
| 2010/0290611 | A1 | 11/2010 | Ramanathan et al. |
| 2011/0035443 | A1 | 2/2011 | Jensen |
| 2011/0138028 | A1 | 6/2011 | Katz et al. |
| 2011/0179180 | A1 | 7/2011 | Schleifer et al. |
| 2011/0231473 | A1 | 9/2011 | Narayanan et al. |
| 2011/0231919 | A1 | 9/2011 | Vangpat et al. |
| 2011/0238761 | A1 | 9/2011 | Mizokami |
| 2011/0271332 | A1 | 11/2011 | Jones et al. |
| 2011/0304686 | A1 | 12/2011 | Qiu et al. |
| 2011/0314014 | A1 | 12/2011 | Junginger et al. |
| 2012/0008753 | A1 | 1/2012 | Burnett et al. |
| 2012/0036566 | A1 | 2/2012 | Nicholson et al. |
| 2012/0084254 | A1 | 4/2012 | Richards et al. |
| 2012/0163577 | A1 | 6/2012 | Buford et al. |
| 2012/0180105 | A1 | 7/2012 | Downes et al. |
| 2012/0185391 | A1 | 7/2012 | Sirota |
| 2012/0190325 | A1 | 7/2012 | Abu-Hakima et al. |
| 2012/0216267 | A1 | 8/2012 | Austel et al. |
| 2012/0254326 | A1 | 10/2012 | Bellan et al. |
| 2012/0254373 | A1 | 10/2012 | Pujare et al. |
| 2012/0274725 | A1 | 11/2012 | Robertson |
| 2012/0303672 | A1 | 11/2012 | Anand et al. |
| 2013/0007150 | A1 | 1/2013 | Hertz et al. |
| 2013/0065618 | A1 | 3/2013 | Long et al. |
| 2013/0066871 | A1 | 3/2013 | Fletcher |
| 2013/0067365 | A1 | 3/2013 | Shrufi et al. |
| 2013/0132285 | A1 | 5/2013 | Richards et al. |
| 2013/0151709 | A1 | 6/2013 | Luna |
| 2013/0160105 | A1 | 6/2013 | Huang et al. |
| 2013/0198386 | A1 | 8/2013 | Srikanth et al. |
| 2013/0246640 | A1 | 9/2013 | Ahrens |
| 2013/0268920 | A1 | 10/2013 | Ursal et al. |
| 2014/0148934 | A1 | 5/2014 | Manley et al. |
| 2014/0280931 | A1 | 9/2014 | Braun et al. |
| 2014/0280932 | A1 | 9/2014 | Braun et al. |
| 2014/0282816 | A1 | 9/2014 | Xie et al. |
| 2014/0282934 | A1 | 9/2014 | Miasnik et al. |
| 2014/0289303 | A1 | 9/2014 | Tarricone et al. |
| 2014/0337954 | A1 | 11/2014 | Ahmed et al. |
| 2015/0039700 | A1 | 2/2015 | West et al. |

(56) References Cited

OTHER PUBLICATIONS

"Nimsoft® Monitor™ Server, Getting Started Guide version 6.00" (Jun. 29, 2012 to Nimsoft), 46 pages.
"Office-LinX Cloud Connect Edition for Cisco Unity Connection", Esna Technologies, Inc., Richmond Hill, ON, Canada © 2012, 2 pages.
Levy, Brian, "The common capability approach to new service development", BT Technology Journal, vol. 23, No. 1, Jan. 2005, pp. 48-54.
Microsoft Computer Dictionary, 5th Edition, Microsoft Press, Redmond, WA, (c) 2002, p. 16.
Microsoft Computer Dictionary, 5th Edition, Microsoft Press, Redmond, WA, (c) 2002, p. 474.
Bogusz, Dariusz, et al., "Telco 2.0 for UC—an example of integration telecommunications service provider's SDP with enterprise UC system", FedCSIS 2012, Wroclaw, Poland, Sep. 9-12, 2012, pp. 603-606.
Ennai, Anuraj, et al., "MobileSOA: A Service Oriented Web 2.0 Framework for Context-Aware, Lightweight and Flexible Mobile Applications", EDOCW 2008, Munich, Germany, Sep. 16, 2008, pp. 345-352.
Beuchelt, G., et al., "RESTful Services Guidance for Developers v 1.0", MITRE Technical Report MTR100093, Apr. 2010, 46 pages.
"Web Application Description Language", Wikipedia, downloaded from en.wikipedia.org/wiki/Web_Application_Description_Language on Feb. 2, 2015, pp. 1-3.
"Representational state transfer", Wikipedia, downloaded from en.wikipedia.org/wiki/Representational_state_transfer on Feb. 2, 2015, pp. 1-5.
"Cisco Unified Communications System Description Release 8.5(1)", Cisco Systems, Inc., San Jose, CA, (c) 2010, 90 pages.
Technical Specification "Interdomain Federation for IM and Presence Service on Cisco Unified Communications Manager, Release 9.0(1)", Cisco Systems, Inc., San Jose, CA, Jul. 18, 2012, 188 pages.
"Chapter 21—Voice Messaging", Cisco Unififed Communications System Description—Release 9.0 SRND, Cisco Systems, Inc., San Jose, CA, Apr. 30, 2013, 44 pages.
Supplementary European Search Report issued Aug. 20, 2014 in corresponding EP Application No. EP 11862613 filed Apr. 26, 2011, inventor Pujare, Sanjay et al.
PCT International Search Report issued Oct. 22, 2014 in corresponding PCT Application No. PCT/US2014/041595 filed Jun. 9, 2014, inventor Pujare, Sanjay et al.
PCT International Search Report issued Jan. 2, 2015 in corresponding PCT Application No. PCT/US2014/059944 filed Oct. 9, 2014, inventor Pujare, Sanjay et al.
PCT International Search Report issued May 23, 2012 in corresponding PCT Application No. PCT/US2012/024014 filed Feb. 6, 2012, inventor Pujare, Sanjay et al.
PCT International Search Report issued Jul. 28, 2015 in corresponding PCT Application No. PCT/US14/40711 filed Jun. 3, 2014, inventor Pujare, Sanjay et al.
PCT International Search Report issued Jul. 8, 2011 in corresponding PCT Application No. PCT/US11/34009 filed Apr. 26, 2011, inventor Pujare, Sanjay et al.
PCT International Search Report issued Aug. 5, 2016 in corresponding PCT Application No. PCT/US16/31304 filed May 6, 2016, inventor Bellan, Saravanan et al.
PCT International Search Report issued Aug. 26, 2016 in corresponding PCT Application No. PCT/US16/31330 filed May 6, 2016, inventor Bellan, Saravanan et al.

* cited by examiner

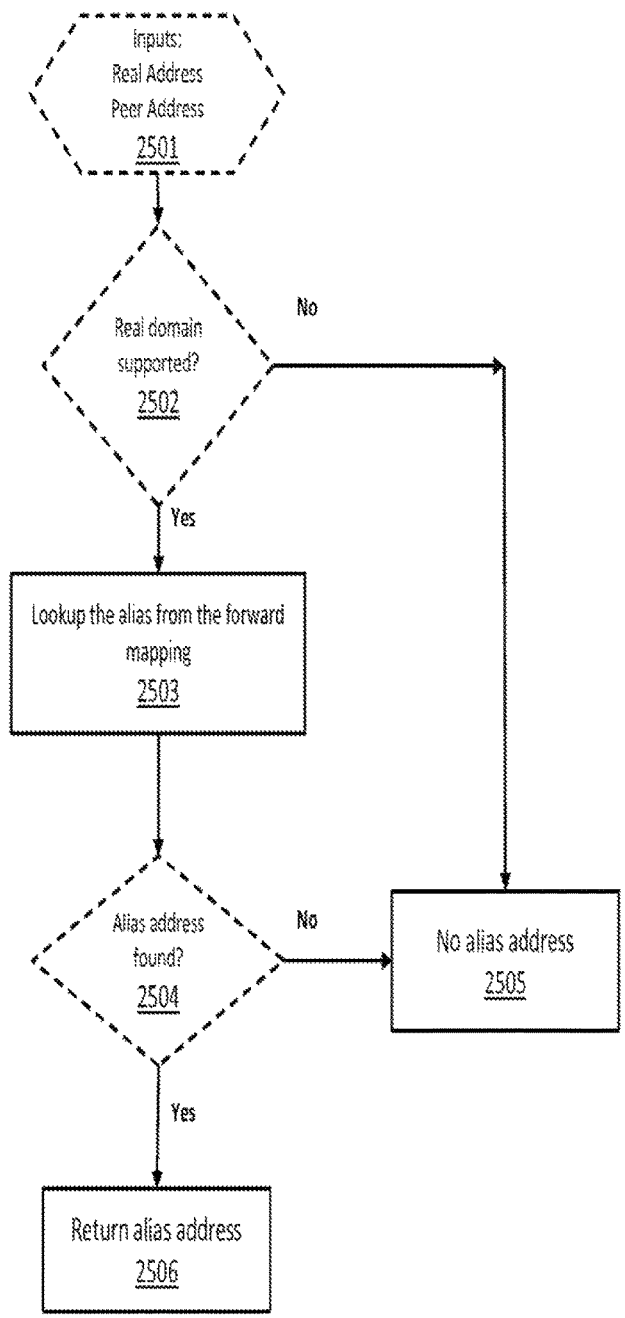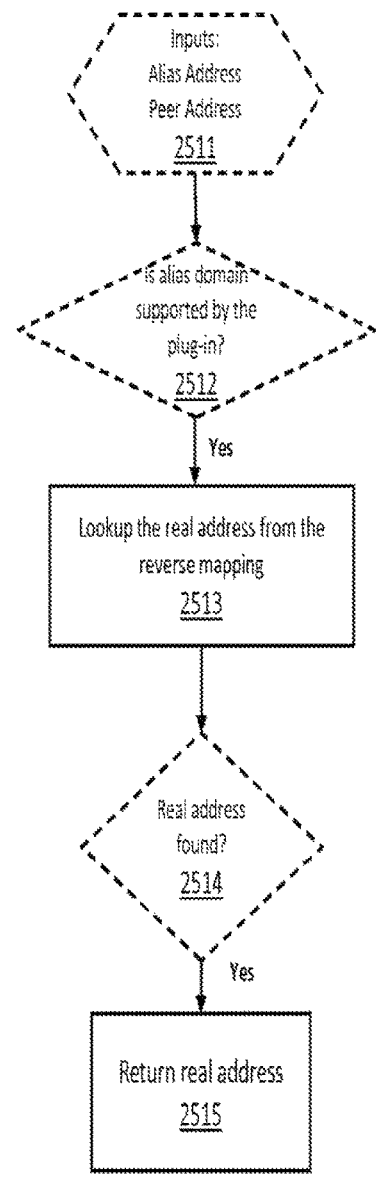
FIG. 25A
FIG. 25B

METHOD AND SYSTEM FOR ADVANCED ALIAS DOMAIN ROUTING

This application is a continuation of U.S. application Ser. No. 13/153,025, filed Jun. 3, 2011 (U.S. Pat. No. 9,203,799), which is a continuation-in-part of U.S. patent application Ser. No. 13/077,710, titled "Hub Based Clearing House for Interoperability of Distinct Unified Communications Systems," filed Mar. 31, 2011 (U.S. Pat. No. 9,077,726), each of which is incorporated herein by reference in its entirety.

FIELD

The present method and system relate to unified communications (UC) systems, and more particularly, to advanced alias domain routing.

BACKGROUND

A unified communications (UC) system generally refers to a system that provides users with an integration of communications services. Users typically connect to the UC system through a single client to access the integrated communications services. The integrated communications services may include real-time services, such as instant messaging (IM), presence notifications, telephony, and video conferencing, as well as non-real-time services, such as email, SMS, fax, and voicemail.

Organizations, such as corporations, businesses, educational institutions, and government entities, often employ UC systems to enable internal communication among its members in a uniform and generally cost-efficient manner. In addition, organizations may employ UC systems for communicating with trusted external entities.

Third-party developers offer various UC applications for implementing UC systems. The various applications include Microsoft Office Communications Server (OCS), IBM Sametime (ST), Google Apps, and Cisco Jabber. Because there is no industry standard regarding UC systems, issues of incompatibility arise when one UC system needs to communicate with a different UC system. In one case, a corporation or business that employs a particular UC system may desire to communicate externally with vendors or other persons who employ different UC system. Or in the case of internal communication, when an organization that employs a particular UC system "A" merges with another organization that employs a UC system "B", the ability for users on system "A" to communicate with users on system "B" is often desirable. Nevertheless, the incompatibility of the UC systems often makes communication between the UC systems difficult or impossible to implement.

There are numerous organizations running Google Apps while also using Microsoft OCS in a different part of their organization. Situations such as these can be tricky if the organization wants to federate both platforms as well as allow them to share the same domain name for all facets and members of their organization. One example of such an organization is a university running Google Apps for its students and Microsoft OCS for faculty. The university's dual UC platform environment creates a situation in which it cannot maintain a single domain name (university.edu) for all members of the university community. Therefore, there exists a need for a system and method to federate multiple disparate UC platforms so their end users can work together as if they were served by the same UC in the same domain.

SUMMARY

A method and system for advanced alias domain routing are disclosed. According to one embodiment, a computer implemented method comprises receiving an incoming message from a first unified communications server, the incoming message comprising source address data destination address data, and digital content. A real address of a destination address is computed by using the source address data, and an alias address of a source address is computed by using the destination address data. The incoming message is processed, wherein processing the incoming message includes enforcing policies. An outgoing message is generated comprising the digital content, the real address and the alias address. The outgoing message is transmitted to a second unified communications server.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

FIGS. 25A and 25B illustrate exemplary SDR plug-in processes for use with the present system, according to one embodiment.

Figure 1:
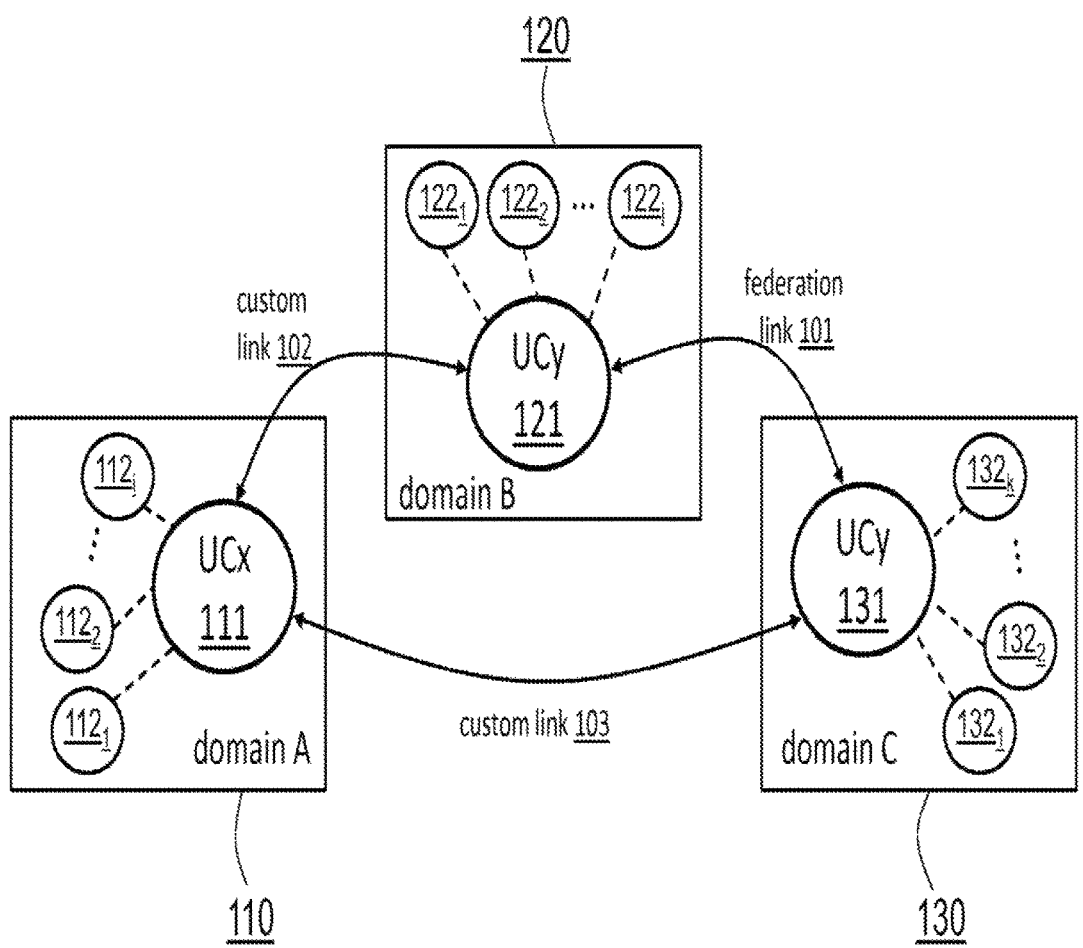
FIG. 1 illustrates a block diagram of a prior, art system for interconnecting three UC systems using custom and federation links.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A method and system for advanced alias domain routing are disclosed. According to one embodiment, a computer implemented method comprises receiving an incoming message from a first unified communications server, the incoming message comprising source address data, destination address data, and digital content. A real address of a destination address is computed by using the source address data, and an alias address of a source address is computed by using the destination address data. The incoming message is processed wherein processing the incoming message includes enforcing policies. An outgoing message is generated comprising the digital content, the real address and the alias address. The outgoing message is transmitted to a second unified communications server.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or persona computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Infrastructures

FIG. 1 illustrates a block diagram of a prior art system for interconnecting three UC systems using custom and federation links. UC system 111 is running a UC application denoted as "UCx" and UC systems 121 and 131 are running a different UC application denoted as "UCy". Each UC system supports a different domain and is accessible (e.g., instant messaging, emailing, video conferencing, etc.) by its respective set of users in the domain. As such, users $112_1$-$112_i$ in domain A 110 can communicate with one another through UC system 111. Similarly, users $122_1$-$122_j$ in domain B 120 and users $132_1$-$132_k$ in domain C 130 can access UC systems 121 and 131, respectively, to communicate with other users in the same domain. Because a user generally interacts with a UC system through a user client device ("client"), the terms 'user' and "client" are used interchangeably in this disclosure.

Issues arise, for instance, when users in domain B 120 need to communicate with users in domain A 110 or users in domain C 130. Without a communications link between users in two different domains, the users in a domain can only communicate (through its UC system) with users in the same domain. Here, as FIG. 1 illustrates, federation link 101 provides a communications link between UC system 120 and 130. A federation link allows users in different domains to communicate with each other so long as the associated UC systems are running the same UC application. In this case, because UC systems 121 and 131 both run UC application "UCy", federation link 101 allows users $122_1$-$122_j$ to communicate with users $132_1$-$132_k$. Whether a federation link is available depends on the particular UC system.

However, where the UC systems are not running the same UC application, as between UC system 111 and UC system 121, there is typically no federation link available because a third-party developer would only provide support for its own product. Historically, one way to provide a communications link between UC systems 111 and 121 is to build a custom link 102, as FIG. 1 illustrates. Custom link 102 includes a translator that translates messages from UC system type "UCx" to UC system type "UCy" and specifically between domains 110 and 120. Because building a custom link is generally expensive in both time and resources, it is not an optimal solution.

Furthermore, custom links are not scalable. As FIG. 1 illustrates, even after a custom link 102 is implemented between domain A 110 and domain B 120, a second custom link 103 would need to be implemented in order for users in domain A 110 to communicate with users in domain C 130. Thus, implementing the infrastructure of FIG. 1 requires three unique communications links.

Figure 2:
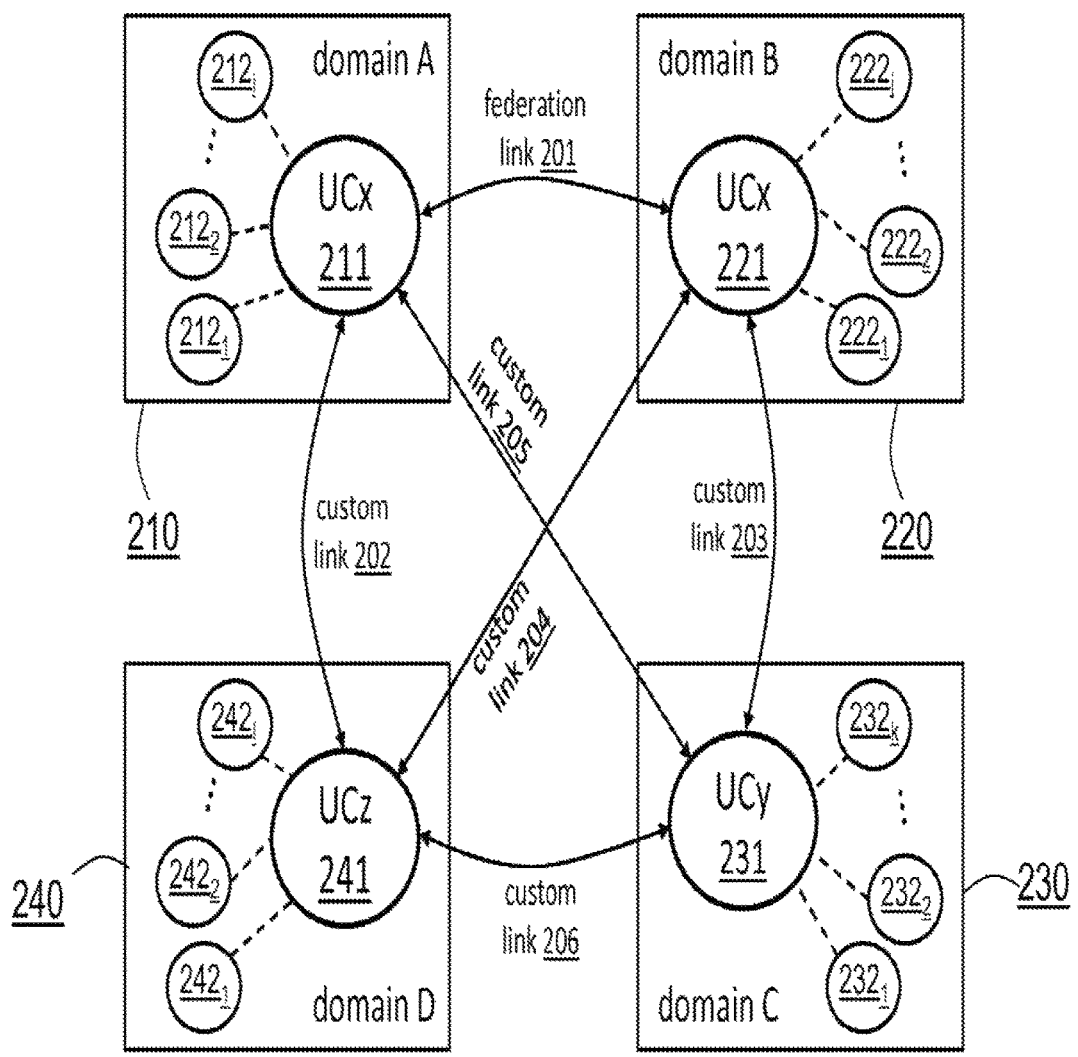
FIG. 2 illustrates a block diagram of a prior art system for interconnecting four UC systems using custom and federation links.

FIG. 2 illustrates a block diagram of a prior art system for interconnecting four UC systems using custom and federation links. As FIG. 2 illustrates, the scaling problem escalates when four UC systems in four different domains are interconnected using custom and federation links. Federation link 201 between UC systems 211 and 221 provides a communications support between users in domain A 210 and users in domain B 220. Federation link 201 is available as both associated UC systems 211 and 221 run the same UC application denoted by "UCx". Because UC systems 231 and 241 each run different UC applications (denoted by "UCy" and "UCz" respectively), the infrastructure of FIG. 2 requires implementing six unique communications links (five custom links 202-206 and one federation link 201) in order for users in any of the four domains to communicate with one another. Thus, the complexity of implementing custom links essentially doubled (from the implementation of FIG. 1 to FIG. 2) by adding just one UC system running a different UC application. As such, infrastructures that employ custom links are not scalable. There exists a need for a highly scalable system for interconnecting distinct and independent UC systems in a federated manner to provide communications support among users of the UC systems.

Figure 3:
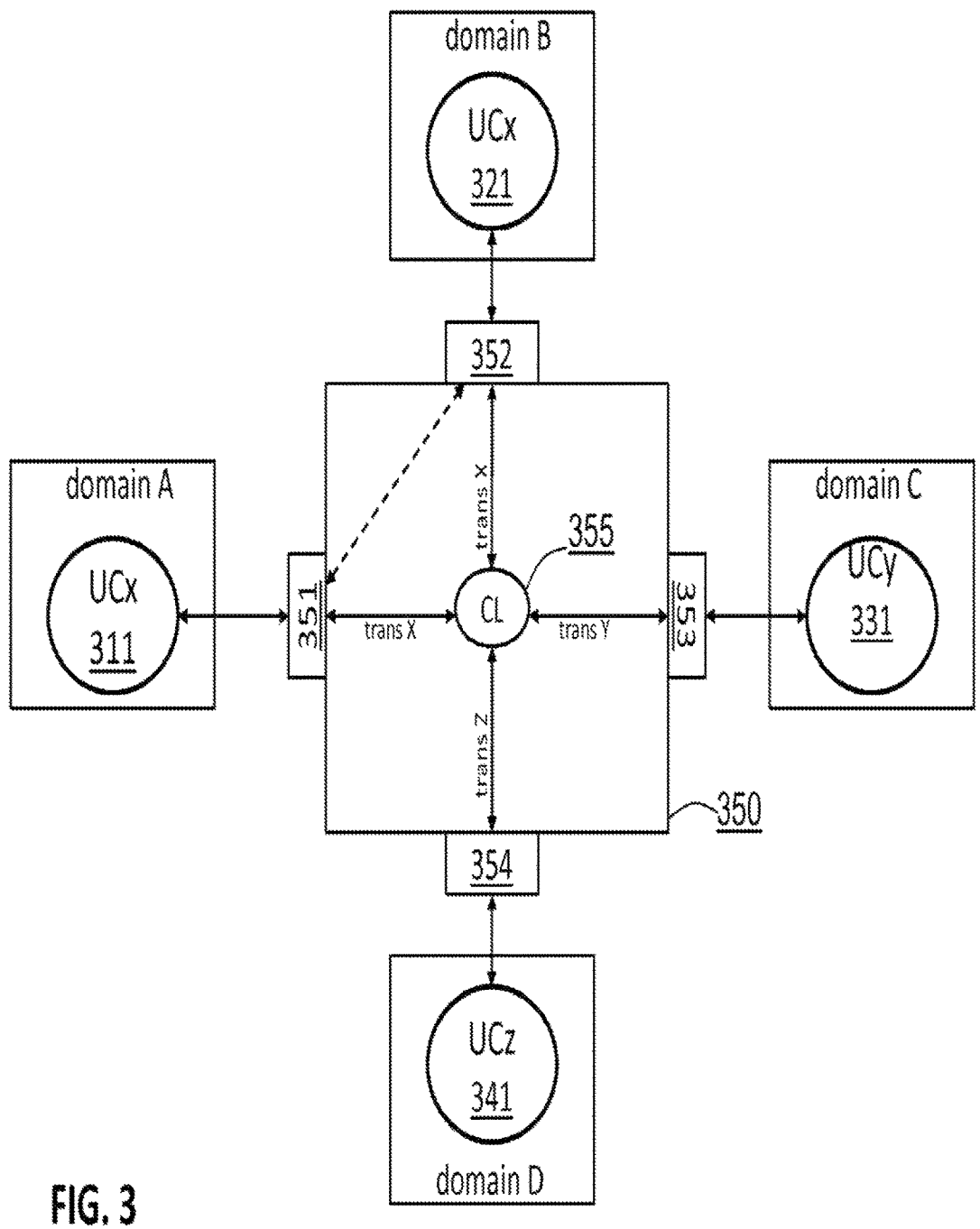
FIG. 3 illustrates a block diagram of an exemplary highly scalable system for interconnecting UC systems, according to one embodiment.

FIG. 3 illustrates a block diagram of an exemplary highly scalable system for interconnecting UC systems, according to one embodiment. While FIG. 3 only illustrates interconnecting four UC systems 311, 321, 331, and 341 the present system can interconnect and support any number of UC systems. The exemplary system of FIG. 3 employs a hub 350 that includes four connectors 351-354. Although FIG. 3 illustrates that each connector communicates with one of the four UC systems 311, 321, 331 and 341, each connector can support any number of UC systems as long as the connector and the UC systems utilize or speak the same protocol (SIP, XMPP, or any other) and are within reach of one another in terms of network connectivity. Generally, one connector per UC protocol is needed per realm. A realm is the network region that is reachable from a network interface (to which the connector is bound).

The hub 350 acts as a central station for translating incoming data from any supported UC system into a common language (CL) 355. Depending on the UC application that is implemented on the receiving UC system, the CL 355 is then translated into the language that is supported by the receiving UC system. For instance, a message that is transmitted by UC system 331 and intended for UC system 341 is first transmitted to the hub 350 via connector 353. The message is then translated by hub 350 into a CL 355. Because the message is intended for UC system 341, the CL 355 is then translated into the language that is recognized by the UC application denoted by "UCz" and transmitted to UC system 341 via connector 354.

Similarly, a message that is transmitted by UC system 321 and intended for UC system 341 is first transmitted to the hub 350 via connector 352 and then translated into a CL 355. Again, the CL 355 is then translated into the language that is recognized by the UC application denoted by "UCz" and transmitted to UC system 341 via connector 354. In the case in which two UC systems are running the same UC application, the hub may route a message sent from one UC system to the other without performing translations. As FIG. 3 further illustrates, the hub 350 may, for instance, route a message sent by UC system 311 to UC system 321 without performing translations, as indicated by the perforated line.

The hub may also perform direct translation (e.g., from "UCy" type to "UCz" type) without first translating the message into a CL. Direct translation may be used to achieve higher efficiency and to maintain high fidelity communications.

Under the exemplary embodiment of FIG. 3, each UC system thinks that it is communicating with a UC system that is running the same UC application as itself. Rather than having to maintain separate federations among each particular domain, as illustrated in FIGS. 1 and 2, a network administrator can create a clearing house community that connects multiple domains through a single hub. One advantage of the exemplary system of FIG. 3 is its scalability. For instance, consider adding to the infrastructure of FIG. 3 an additional UC system that is implemented on a new UC application and is associated with a new domain. The addition may simply be implemented by adding the functionality (a one-time job) for translating between the language used by the new UC application and the common language. Depending on the network configurations, an allow list may also need to be updated (also a one-time job) to include any existing or added domain that does not publish an SRV record (discussed more later). Once added, the new UC system would be able to communicate with any of the UC systems already connected to the hub and vice versa. In contrast, adding a new UC system to the infrastructure of FIG. 2 would require building four additional custom links (one for each of the pre-existing UC systems).

In addition to solving the scalability issues described above, the hub or clearing house system illustrated in FIG. 3 also provides for the ability to implement additional features. For instance, the present hub may provide for preservation of high fidelity communication. This disclosure contemplates employing a common language (CL) format that provides for full translation from one UC language format to another without unnecessary or unavoidable loss of information. This may be accomplished by translating the UC formatted message into a CL formatted message such that no data is discarded until the CL formatted message is translated into the UC format that is recognized by the receiving UC system. Unlike using a lowest common denominator approach to defining the CL in which all communications are lowered to the UC language format with the least common functionality, employing a CL format that provides for full translation preserves high fidelity communication between UC systems.

Consistent with one embodiment, the CL is a superset language that supports features (e.g., fields) of all supported UC language formats. For instance, the CL may contain some or all the fields of a supported UC language format. Also, the CL may be an evolving language wherein new syntax (headers) can be added to accommodate any new features that become available in supported UC systems. The new syntax may then be used by all the translators to translate a CL formatted message into a message of respective UC format that supports these new features. In one embodiment, an appropriate CL format is generic SIP.

The hub system also allows administrators to set and enforce policies by virtue of it being a hub for all inter-domain communication. When a UC system in one domain communicates directly (without going through a hub) with a UC system in another domain, administrators of each domain can only control incoming and outgoing messages locally. However, if the UC systems communicate with each other through a huh, the hub allows administrators of each UC system to access the part of the hub that applies to them so that they can administer policies that are not possible to administer locally. For instance, an administrator may administer one or more policies through the hub to allow a user in one domain to make his status appear as available to only certain members of another domain. Such granular control in setting policies is generally not available to administrators of domains interconnected using just federation and custom links.

Hub

Figure 4:
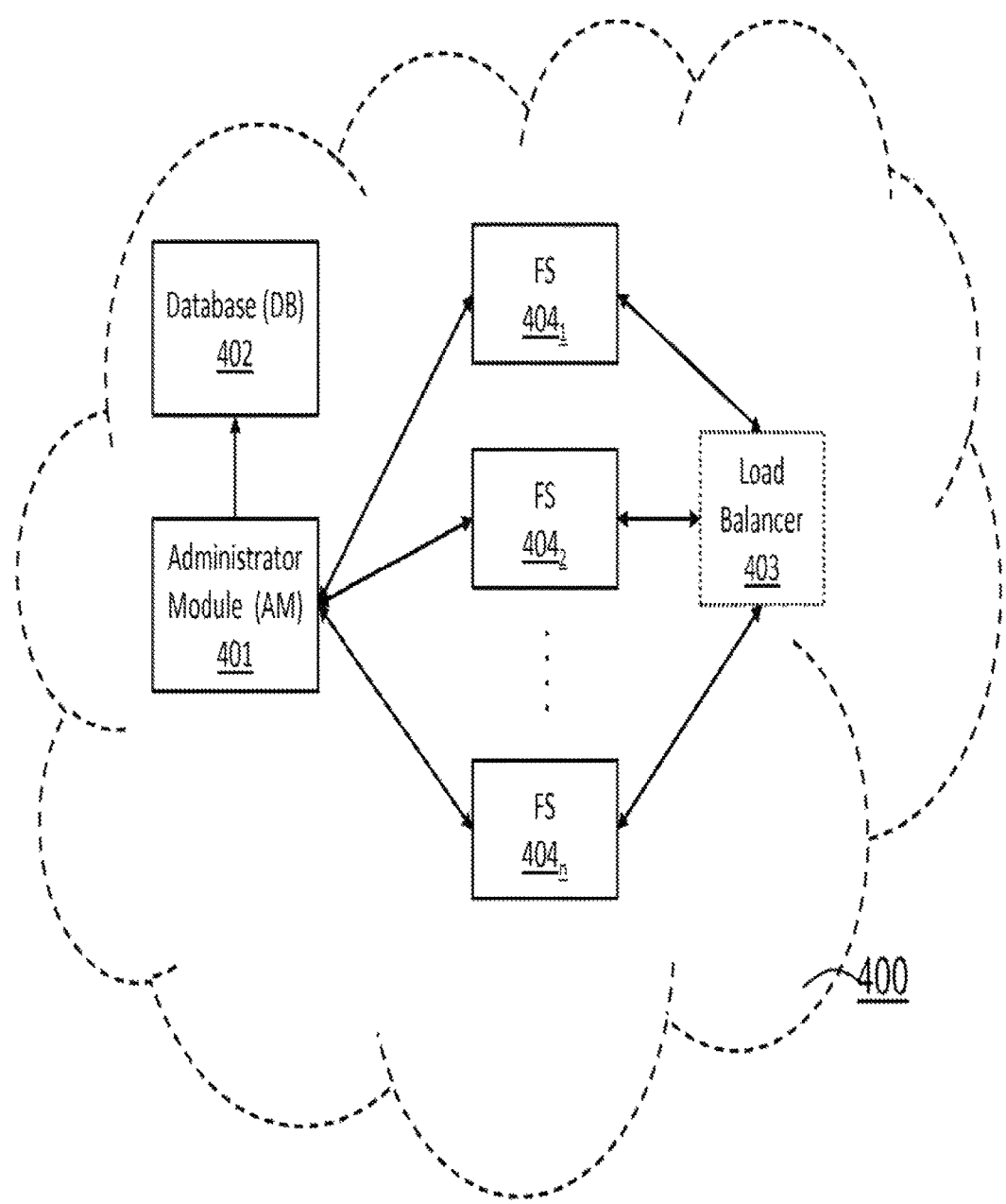
FIG. 4 illustrates a block diagram of an exemplary hub that is implemented as cloud services, according to one embodiment.

FIG. 4 illustrates a block diagram of an exemplary hub that is implemented as cloud services, according to one embodiment. That is, a hub does not necessarily run on a particular server installation or from any particular location. A hub may be broken into four main components: an administration module (AM), a database (DB), a federation server (FS), and a load balancer (LB). A federation server (FS) includes a routing engine, according to one embodiment. While a hub may be implemented using a single computer, FIG. 4 illustrates an exemplary embodiment in which the hub is implemented using several computers, each computer carrying out a specific function, and networked together to create a single installation.

Hub 400 includes an administration module implemented on computer 401. An administration module (AM) is a software program that allows hub system administrators to configure the hub to provide UC systems with access to the hub. There is typically one AM for each installation. The AM configures the hub by creating and updating a data store in a database (DB) implemented on computer 402. The data store contains the information that is used by the federation servers (FS's) to perform their functions. Each of the FS's may be implemented on separate computers $404_{1-n}$. FIG. 4 further illustrates an optional load balancer 403 that manages and directs communications traffic from UC systems to the FS's to make efficient use of the available system resources.

Some of the configurable parameters and desired settings of the AM are as follows:
1. Administrator Settings
   a. In the administration settings the hub administrator can configure the hub to allow for public federation (e.g., allowing the hub to connect to public instant messenger systems such as Google Chat, AIM, and Yahoo Messenger).
   b. A default setting allows federation even if no policy applies to a message. This can be reversed by the administrator so that federation is allowed only if a policy applies to a message.
2. Realms
   a. A physical network card in the FS machine may be configured to support one or more connectors, one connector per protocol. A connector is created by configuring a physical network card to use a supported protocol, such as SIP or XMPP or both, and is described in further detail below.
3. Private Keys and Certificates
   a. Private and public keys may be configured within the hub so that the FS can communicate with UC systems securely. The AM allows private keys to be created for the hub by creating a self-signed key and then creating a certificate signing request which is sent to a certification authority (CA) such as Verisign or Entrust. The reply to the request is imported back into the hub, at which point, the hub can send its public certificate to all the connected UC systems.
   b. The AM acquires public certificates for all domains it would communicate with. The AM fetches the certificate for a domain present in the data store provided the hub is able to communicate over TLS with this domain.

4. Federation Servers
   a. The AM allows administrators to create, edit, and delete servers after the server has been physically built with the proper hardware. The proper settings for creating a federation server depend on the number of network cards installed on the server. Each network card may be configured to use each type of connector that is used within the realm that it is associated or may serve, as a spare or may be used for other communication purposes (e.g., to DB or to the AM). A connector typically supports a single UC protocol (e.g., SIP or XMPP). However, a connector may have multiple transports configured for its UC protocol (e.g., a SIP connector configured to support SIP over TLS and SIP over TCP and an XMPP connector configured to support XMPP over TCP and XMPP over TLS).
   b. The administrator also configures private keys and corresponding public keys and certificates so the AM can communicate internally with each FS in the installation securely. The AM and each FS communicate over TLS which requires that the AM and each FS have a private key and that the corresponding certificates (public keys) are available to the other side. This enables the AM and each FS to communicate internally over TLS.
5. Domains
   a. The following information for each domain that will be communicating through the hub are added to the database:
      i. Domain name (e.g., UC4.acme.com)
      ii. Whether the Domain is public or not
      iii. One of the following methods of acquiring the IP address s required:
         1. Use DNS SRV record to fetch the IP address
         2. Use the FQDN to fetch the IP address
         3. Input the IP Address directly.
6. Policies
   a. Each policy has a name and action flags (e.g., allow, deny). There may be six types of messages that flow thru the hub: buddy invite, presence, chat, audio call, video call, and file transfer. The criteria for the policy can be specified in a structured fashion using lists and attributes of addresses involved in the address.
      i. Policy actions:
         1. Buddy list invites can be allowed or denied. (A buddy list invite (or SUBSCRIBE as it is called in SIP/XMPP) is sent from user A to user B via the hub when user A adds user B to his contact (buddy) list)
         2. Instant Messages can be allowed or denied.
         3. Presence can be allowed or denied.
         4. Audio calls.
         5. Video calls.
         6. File transfer.
      ii. Policy lists: System administrators create lists in the database which can be referenced in the policy rules. Each list may be used by the policy rules described above. The following are the types of lists that can be created by the administrators:
         1. List of Addresses.
         2. List of Domains.
         3. List of Groups (e.g. Using Microsoft Active Directory).
      iii. Criteria: policy criteria are specified in each policy. These criteria determine when a policy is applied to a message (specifically the source and destination addresses) being processed. Up to five criteria can be specified and each criterion applies to source, destination, both or either address in the message. The operation specified on the address(es) may be one of: is-internal, is-external, is-public, is-present-in-list or the negation of one of them.
7. Directory (For Microsoft Active Directory Functionality)
   a. Administrator can populate users and groups in the data store by having the hub connect to an active directory and download the users and groups, which eliminates duplication of data already present. Once these users and groups are downloaded, the administrator can reference them in the policies as described above.

Once the AM and the connected UC systems have been properly configured, individual users on a configured UC system can connect to other users on any other properly configured (remote or local) UC system.

As mentioned earlier, the AM configures the hub by creating and updating a data store in a database (DB) implemented on computer 402. In addition to storing configuration data received from the AM, the DB also stores data regarding local administrators (administrators of UC systems connected to the hub), local users (users in the domains of associated UC systems), and FS's. In general, because only the AM can directly manipulate data in the DB, local administrators who wish to update the DB data would have to log into the AM to do so. Local user information that may be stored in the DB include usage and audit logging information. The DB may be implemented as a relational data base.

FIG. 4 illustrates that each of the FS's may be implemented on separate computers $404_{1\text{-}n}$. The computers $404_{1\text{-}n}$ are substantially identical to one another regarding their physical hardware configurations. Each ES computer typically has three network cards installed. However, more than or less than three network cards per computer are also contemplated. Furthermore, the software applications installed on each of the computers $404_{1\text{-}n}$ are configured in almost an identical fashion to one another except that each computer is given a unique identification value.

Figure 5:
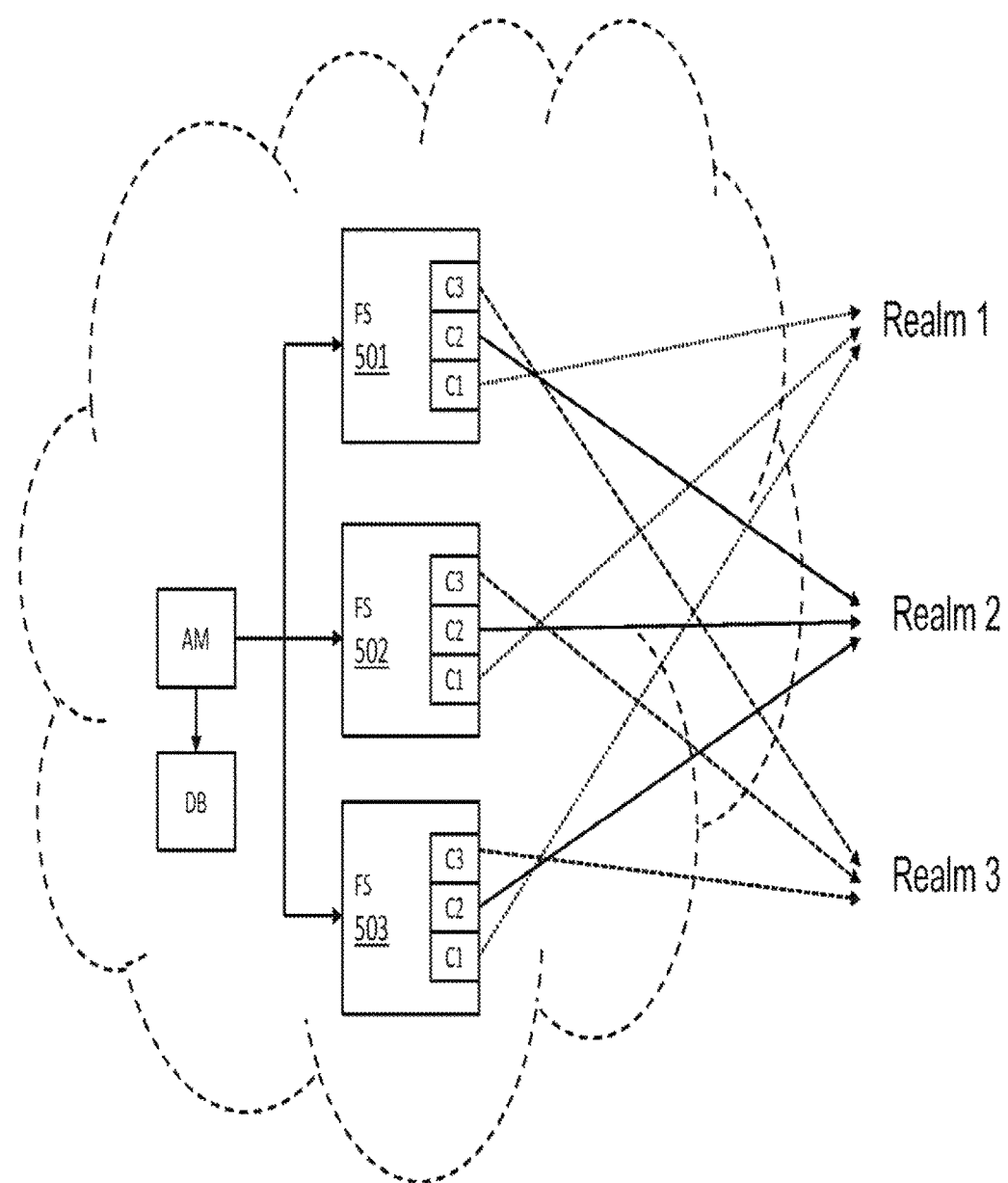
FIG. 5 illustrates a block diagram of an exemplary hub that is connected to each of three realms, according to one embodiment.

FIG. 5 illustrates a block diagram of an exemplary hub that is connected to each of three realms, according to one embodiment. Each of the computers 501-503 has three network cards (C1, C2, and C3) installed. In order for each FS to provide access to each of the three realms, each network card of a FS is connected to a different realm. A realm is a network region or network segment that is reachable through a particular network card. For instance, in an enterprise network there is often an internal network (e.g., intranet) and an external network (e.g., Internet). A computer sitting in the demilitarized zone (DMZ) of the enterprise may need a network card to access the intranet (e.g., realm 1) and another network card to access the Internet (e.g., realm 2). Any number of realms may exist. Another example of a realm is a private network that is accessible through a private link (e.g., remote branch office).

A FS has two main components: (1) instances of connectors, and (2) the DP Application Logic (herein "engine"). A connector is an object that includes both a hardware aspect and a software aspect. The hardware aspect includes a physical network card connection that provides a physical pathway for data to flow into and out of a FS machine. The software aspect of a connector, in its basic form, is comprised of (1) a listening loop that listens on the physical connection and waits for incoming data, and (2) a function that can be called by the FS when data is ready to be sent out from a network card of the FS.

Figure 6:
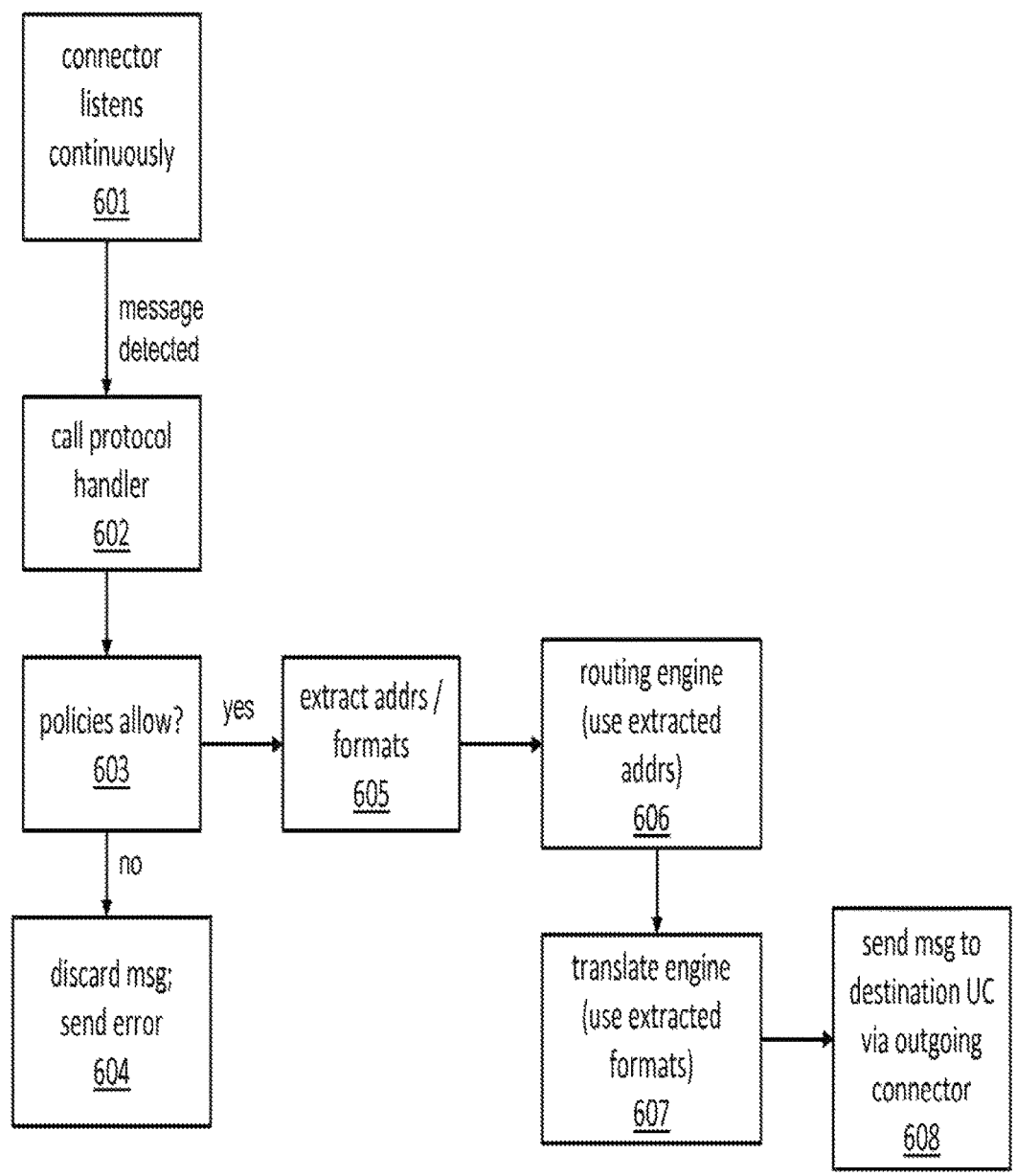
FIG. 6 illustrates a flow chart of an exemplary process for processing messages received from a UC system, according to one embodiment.

FIG. 6 illustrates a flow chart of an exemplary process for processing messages received from a UC system, according to one embodiment. The operations begin with the connectors of the FS continuously listening (at 601) for an on-the-wire message, such as a SIP or XMPP message. If a message is detected, a protocol handler is called (at 602) to translate the detected on-the-wire message into an internal memory representation of the message (IMRM). After translating into an IMRM, the hub message manager (HMM) uses a policy enforcement engine to check the IMRM against policies set up by the administrators (at 603) and decides whether the IMRM should be allowed. If the IMRM is found not to be allowed, an error message is sent back to the incoming connector which received the message and the IMRM is discarded (at 604). The error message, which may include information as to why the message was not allowed, is relayed back to the originating UC through the incoming connector. On the other hand, if the IMRM is found to be allowed, the HMM extracts the destination and source addresses as well as the destination and source UC formats from the IMRM (at 605). Using the extracted addresses the HMM uses a routing engine to determine the destination route for the IMRM (at 606). The routing engine also adds necessary information to the IMRM to ensure the message is ready for the destination domain. For instance, the added information may include routing headers that allow SIP and XMPP outgoing connectors to route the message to the appropriate UC systems. Next, the HMM processes the IMRM using a translation engine (at 607). The translation engine first checks the data store 10 see if direct translation is available. If so, direct translation is used. If not, the translation engine translates the IMRM into the CL format and then translates the CL formatted message into the destination UC format. The translation engine uses the formats that were extracted at 605. After translation into the destination UC format, the message is translated into an on-the-wire format and then sent out to the destination UC system via an outgoing connector (at 608). The outgoing connector is determined by the routing engine at 606 and it uses the realm and the UC protocol of the destination UC system. Thus, connector is used for both sending and receiving messages.

According to one embodiment, the routing engine includes advanced alias domain routing functionality as described in greater detail with reference to FIGS. 18-29 below.

According to one embodiment, implementation of advanced routing scenarios includes a plug-in in the UC. A UC plug-in rewrites addresses before sending a message to the routing engine or after receiving a message from the routing engine. According to one embodiment, the UC plug-in also inserts special headers to indicate additional information. The UC plug-in and the advanced alias domain routing engine work together to implement advanced routing scenarios.

According to one embodiment, there are 3 exemplary address types that are used to accomplish the particular mappings described herein. The address types are the (1) real addresses, (2) alias addresses, and (3) peer addresses. Each is described in turn below:

A) Real Address: The actual address of a user on a UC system.

B) Alias Address: A real address is aliased to an alias address for the purpose of implementing various routing features. When multiple UCs are federating via the Hub the concept of alias enables the hub to perform various advanced routing functions as will be obvious later. For example, aliasing enables imaginary domains to be used either by the hub or by hub users. Aliasing also allows multiple UCs to be associated with a single domain. An alias may exist only inside the hub (i.e. none of the external UCs or UC users need to be aware of the alias) or an alias may be used outside the Hub e.g. by federated UC users or UCs. Note that there can be multiple aliases for a real address. According to one embodiment, there is only one real address for an alias but additional embodiments can include multiple real addresses for an alias.

C) Peer Address: The alias (or more precisely the mapping from real address to alias and vice versa) exists in the context of a peer address. The peer address may include either the source address or the alias address. As an example, johnk@acme.com is the real address of John. If Fred (at address fred@fabrikant.com) thinks John's address is jfk@gadget.com then fred@fabrikant.com is the peer address for which there is a real address/alias relationship between johnk@acme.com and jfk@gadget.com. Further, the real address/alias relationship also exists in the context of a message which is being processed by the routing engine for routing from the sender to the receiver. In the above example, when fred@fabrikant.com starts a chat session with jfk@gadget.com, the message is an INVITE message that establishes the alias/real address relationship from jfk@gadget.com to johnk@acme.com. For "mid-dialog" chat messages the routing engine uses this established relationship to do real address to alias address or reverse mapping.

Figure 7:
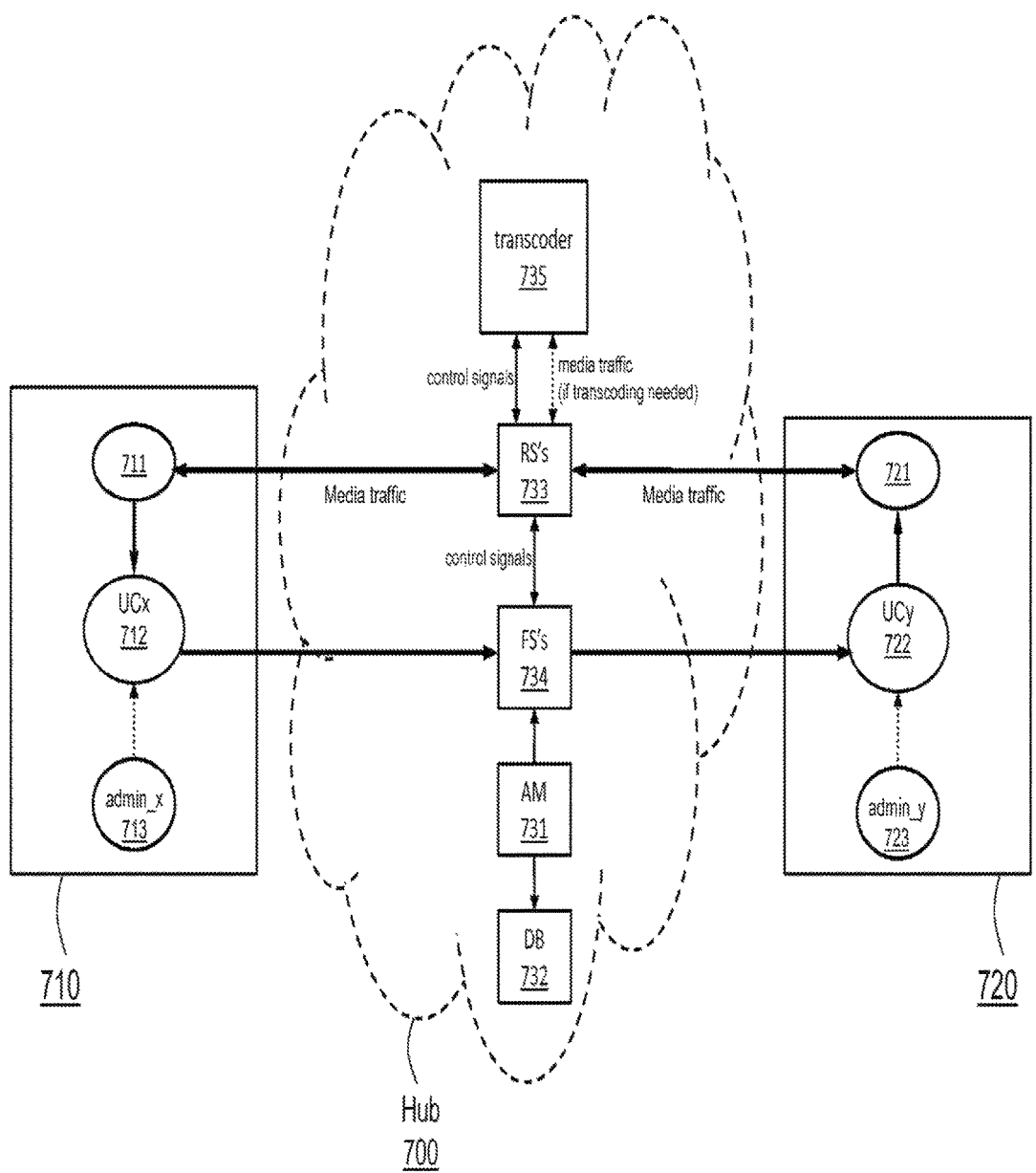
FIG. 7 illustrates a block diagram of an exemplary hub system for processing real-time media traffic such as audio and video traffic, according to one embodiment.

FIG. 7 illustrates a block diagram of an exemplary hub system for processing real-time media traffic such as audio and video traffic, according to one embodiment. As FIG. 7 illustrates, clients 711 and 721 communicate with one another through their respective UC systems 712 and 722 and hub 700. Hub 700 includes a federation server (FS) 734, a relay server (RS) 733, and a transcoder 735. While FS 734 processes messages received from UC systems (e.g., UCx 712 and UCy 722), such as illustrated in FIG. 6, RS 733 processes media traffic such as audio and video traffic between clients 711 and 721. For instance, if FS 734 determines that a media call initiate or INVITE message has been received, FS 734 sends control signals to RS 733 to engage and control certain operations of RS 733. These control signals include start-call, end-call, and caller/callee information such as media endpoint candidates and media codecs that are available. If RS 734 determines that clients 711 and 721 have at least one common media codec that is available to each client, RS 734 relays the media traffic between clients 711 and 721. The media traffic originating from client 711 would flow as follows:

client 711→RS 733→client 721.

Similarly, media traffic originating from client 721 would flow as follows:

client 721→RS 733→client 711.

If there is no common codec that is available to clients 711 and 721, RS 733 engages transcoder 735 to transcode the media traffic from one codec format (e.g. format used by client 711) to another codec format (e.g., format used by client 721) and vice versa. For instance, if transcoding is needed, media traffic originating from client 711 would flow as follows:

client 711→RS 733→transcoder 735→RS 733→client 721.

Similarly, media traffic originating from client 721 would flow as follows:

client 721→RS 733→transcoder 735→RS 733→client 711.

RS 733 engages transcoder 735 via control signals that, for instance, tell the transcoder 735 to set up and tear down the media endpoints (e.g., RTP and RTCP ports) that were set up at the transcoder for sending and receiving, media to/from RS 733.

Although load balancers are not shown in FIG. 7, this disclosure contemplates that a load balancer may be used as an intermediary component of hub 700 for managing and directing communications traffic between UC systems 712 and 722 and FS 734. This disclosure also contemplates employing a load balancer as an intermediary component of hub 700 for managing and directing media traffic between clients 712 and 722 and RS 733. This disclosure also contemplates employing a load balancer as an intermediary component of hub 700 for managing and directing control signals traffic between transcoder 735 and RS 733. This disclosure also contemplates employing a load balancer as an intermediary component of hub 700 for managing and directing media traffic to multiple relay server nodes acting as a single logical relay server RS 733. The use of load balancers allows hub 700 to make efficient use of the available system resources and to be highly scalable.

Figure 8:
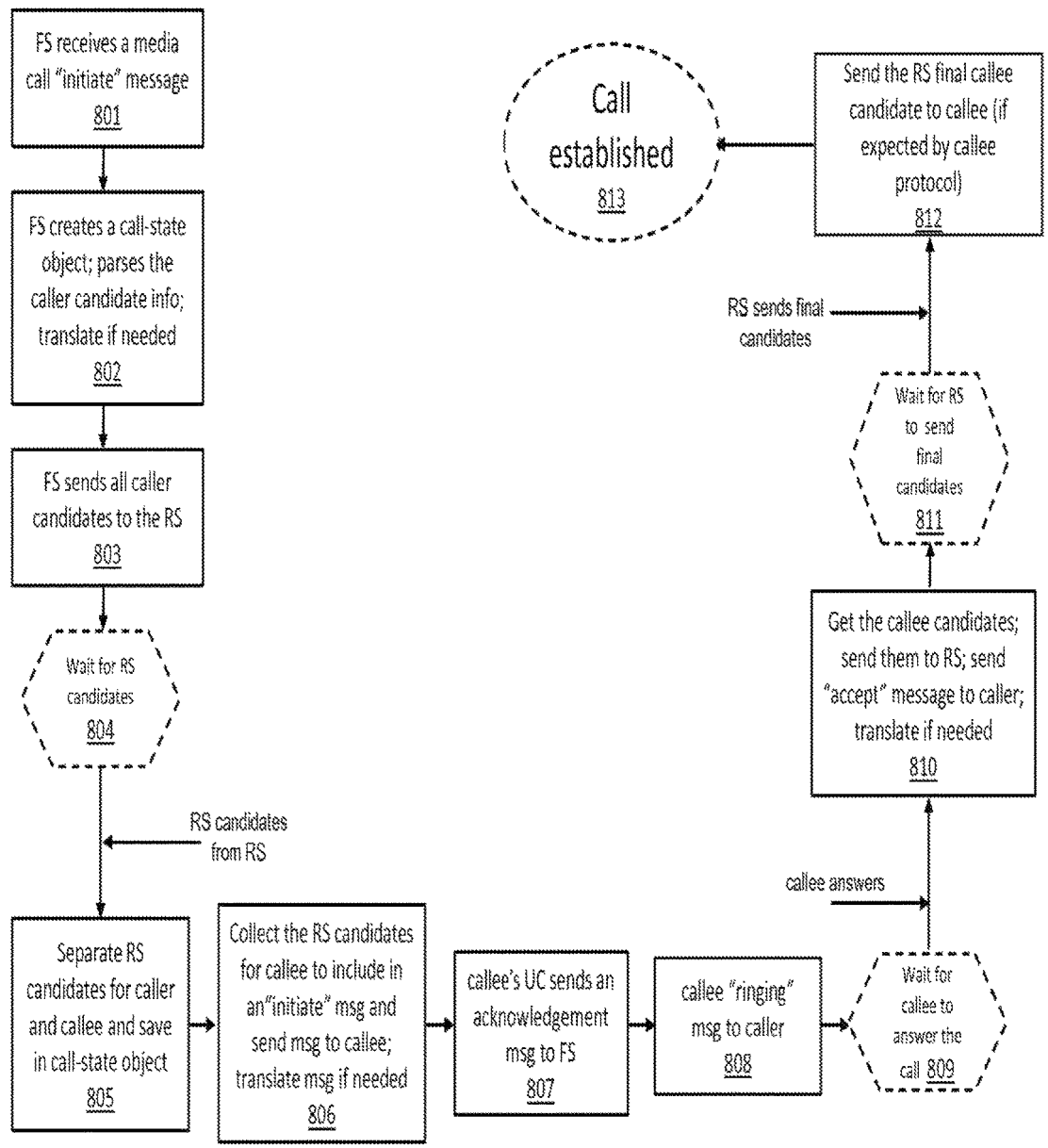
FIG. 8 illustrates a flow chart of an exemplary process for processing a media call by a federation server, according to one embodiment.

FIG. 8 illustrates a flow chart of an exemplary process for processing a media call by a federation server, according to one embodiment. The process begins (at 801) when the federation server (FS) receives a media call initiate or INVITE message from a calling client ("caller"). The initiate message may or may not include the caller candidates. Caller candidates are IF addresses and ports at which the caller can receive media traffic. If the caller candidates are not included, they may be sent in a separate message (not shown in FIG. 8). Next, the FS creates a call-state object and also parses the caller candidate information (at 802). If the caller and the intended client for receiving the caller/callee) employ different UC systems, the message may need to be translated to a common language (CL) format. A call-state object is maintained for each call started and is deleted when the call is hung up.

Next, the FS sends all caller candidates to the RS via an add-candidate message (at 803). (See FIG. 9). The FS waits for the RS to return RS candidates (at 804). RS candidates are IP addresses and ports at which the RS can receive data from clients Because the RS receives data from both a caller and a callee, there are separate RS candidates for the caller and callee. After the FS receives the RS candidates from RS, the FS separates the RS candidates for the caller and the callee and saves them in the call-state object (at 805). Next, the FS collects the RS candidates for callee to include in an initiate message that is sent to the callee (at 806) through the callee's UC system. If the caller and the callee employ different UC systems, the message may need to be translated from a CL format to the language format that is recognized by the callee's UC system prior to being sent. Typically, a response or acknowledgement message is sent back by the callee's UC system after receiving the message (at 807). When the callee receives the initiating message, the callee sends to the caller (e.g., callee→callee UC→FS→caller UC→caller) a ringing message (at 808). Again, if the caller and the callee employ different UC systems, the message may need to be translated to an appropriate format as described earlier in this disclosure.

The FS waits for the callee to answer the call (at 809). After the callee answers the call, the FS parses the answer to obtain the callee candidates, which are then sent to the RS. Callee candidates are IP addresses and ports at which the callee can receive media traffic. The FS also sends an accept message (translated if appropriate) to the caller (at 810). The accept message signals to the caller that the callee has accepted the call. The accept message also contains the RS candidates for the caller. After receiving these RS candidates, the caller may use them to establish connectivity thru ICE negotiation, such as described in FIG. 10.

Next, the FS waits for the RS to return final candidates (at 811). Final candidates are IP addresses and ports are the best remote candidates for transferring data between the RS and the caller/callee. The RS determines the final candidates by performing ICE connectivity checks (e.g., exchanging STUN messages) with both the caller and the callee. For instance, the RS would use different pairs of callee candidates and RS callee candidates to exchange STUN messages to determine the final callee and RS callee candidates. Similarly, the RS would use different pairs of caller candidates and RS caller candidates to exchange STUN messages to determine the final caller and RS caller candidates. After the RS returns the final candidates, the FS may send the final RS callee candidate to the callee if the callee protocol expects it (at 812). Finally, the call is established (at 813).

Figure 9:
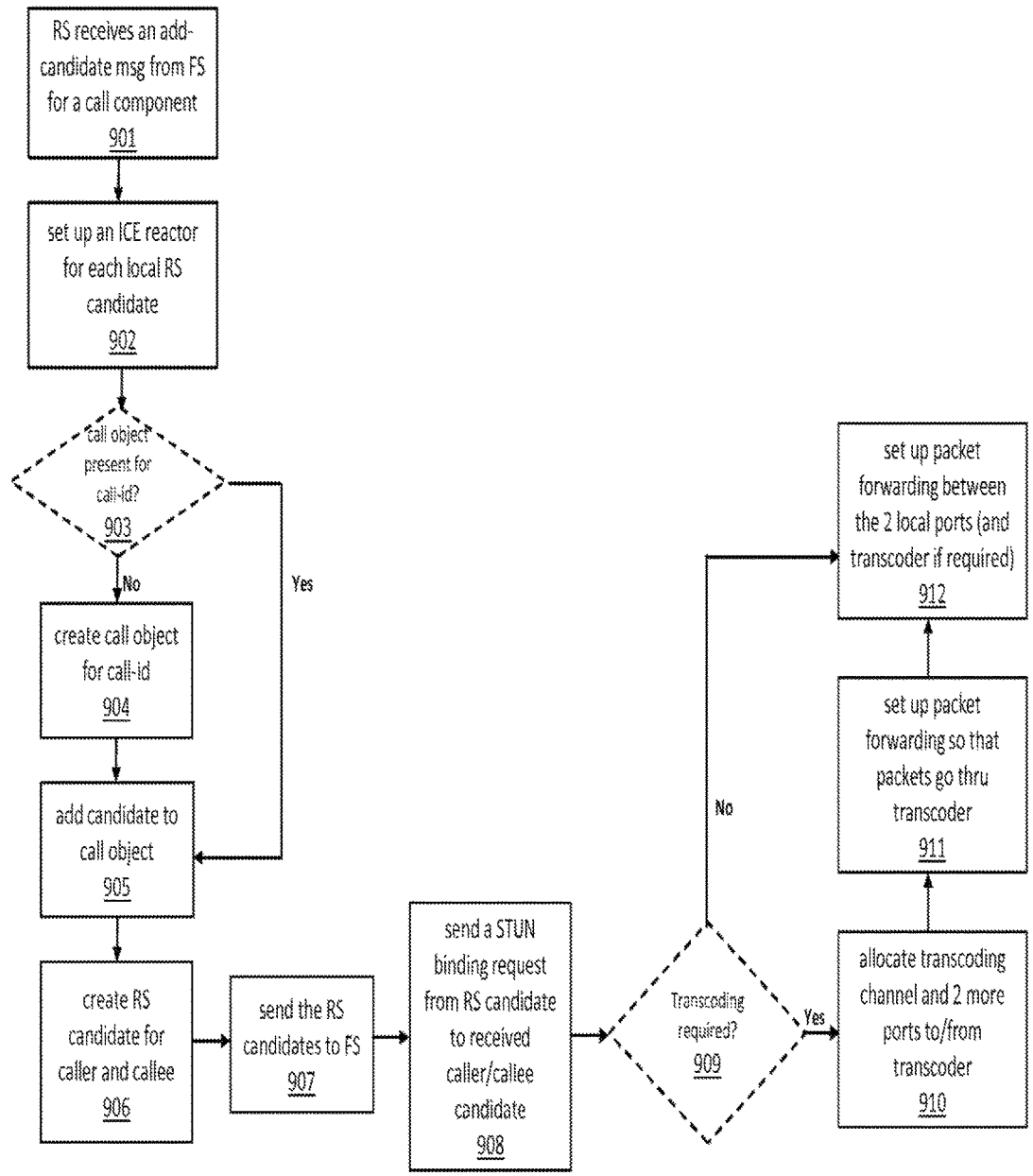
FIG. 9 illustrates a flow chart of an exemplary process employed by a relay server for adding candidates, according to one embodiment.

FIG. 9 illustrates a flow chart of an exemplary process employed by a relay server for adding candidates, according to one embodiment. The process begins when relay server (RS) receives an add-candidate message from the federation server (FS) for a call component (at 901). A call has multiple components such as audio-rip, audio-rtcp, video-rtp and video-rtcp. Each component carries a certain aspect of media traffic. For instance, audio-rtp carries audio packets and video-rtp carries video packets. Rtcp is for control of rtp. The process applies to all components of a call. An add-candidate message is a request for the RS to return (to the FS) RS candidates for a caller and a callee and may include the following: call-id, caller address (e.g., IP address and port per candidate), callee address, and caller UC system (e.g., OCS or GTalk).

Next, the RS sets up an ICE reactor for each local RS candidate (at 902). An ICE reactor performs at least two functions. One function is to establish ICE connectivity through STUN negotiation. After connectivity is established, a second function is to forward data packets between two peers. Next, the RS determines whether a call object is present for the call-id associated with the add-candidate message (at 903). If no call object is present, the RS creates a call object for the call-id (at 904). Next, the RS adds the candidates that are provided in the message to the call object (at 905). The RS then creates RS candidates for each of the caller and the callee (at 906) and sends them to the FS (at 907).

Next, the RS sends STUN binding requests through RS caller candidates and RS callee candidates to caller candidates and callee candidates, respectively (at 908). Next, the RS determines whether transcoding is required (at 909). Transcoding may be required if there exists no common media codec that is used by both caller and callee. If transcoding is not required, the RS sets up packet forwarding between the two local ports that have been allocated for the caller and the callee (at 912). For instance, if port A is used by the caller and port B is used by the callee, the RS forwards packets from A to B and vice versa. If transcoding is required, the RS allocates a transcoding channel and two additional ports for (e.g., port C for sending traffic to transcoder and port ID for receiving traffic from transcoder) for communicating with the transcoder (at 910). The RS then sets up packet forwarding so that packets go through the transcoder (at 911). For instance, if transcoding is required, then the packet forwarding through the ports A to D would be as follows:

A→C→transcoder→D→B and vice versa.

Figure 10:
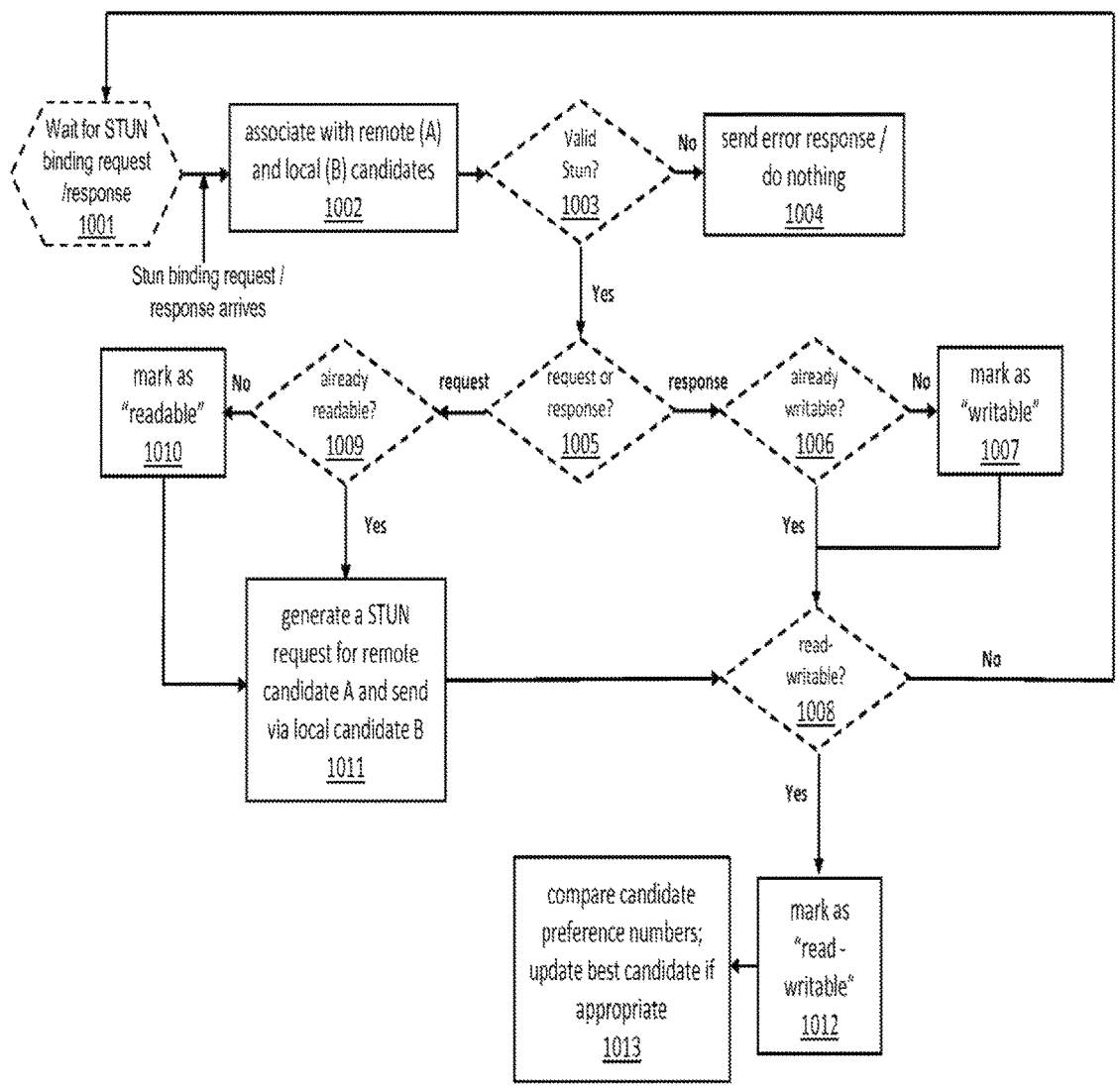
FIG. 10 illustrates a flow chart of an exemplary process employed by an ICE reactor that is part of a relay server for establishing ICE connectivity through STUN negotiation according to one embodiment.

FIG. 10 illustrates a flow chart of an exemplary process employed by an ICE reactor for establishing ICE connectivity through STUN negotiation, according to one embodiment. An ICE reactor is set up for each local port that is allocated for a specific call. The ICE reactor ("reactor") waits for a STUN binding request/response ("STUN message") (at 1001). When a STUN message arrives to the port, the ICE reactor (or rather RS) knows which call it is for and associates it with remote (A) and local (B) candidates (at 1002). The reactor then determines whether the STUN message is valid (at 1003). The determination may be made based on industry standards, such as described in RFC5389 published by the Internet Engineering Task Force (IETF). If the STUN message is not valid, the reactor sends an error response back to the originator of the STUN message if the message is a request or does nothing if the message is a response (at 1004).

If the STUN is valid, the reactor then determines whether it is a response or a request (at 1005). If the STUN is a response, the reactor determines whether remote candidate A is already writable (at 1006). If remote candidate A is already writable, the reactor proceeds to 1008. Otherwise, the reactor marks remote candidate A as writable (at 1007) before proceeding to 1008. If the STUN is a request, the reactor determines whether remote candidate A is already readable (at 1009). If remote candidate A is already readable, the reactor proceeds to 1011. Otherwise, the reactor marks remote candidate A as readable at 1010) before proceeding to 1011. At 1011, the reactor generates a STUN request for remote candidate A that is sent via local candidate B.

At 1008, the reactor determines whether remote candidate A is both readable and writable. If remote candidate A is both readable and writable, the reactor marks remote candidate A as read-writable (at 1012), indicating that the candidate is ready to be used for communication, before proceeding to 1013. Otherwise, the candidate is not ready to be used for communication and the reactor proceeds back to 1001. At 1013, the reactor determines whether the current candidate is preferred over the best remote candidate. For instance, the reactor may compare the current candidate's preference number with that of the best remote candidate (e.g., candidate associated with highest preference number). If the current candidate's preference number is higher than (e.g., preferred over) that of the best remote candidate, the reactor makes the current candidate the best remote candidate.

Figure 11:
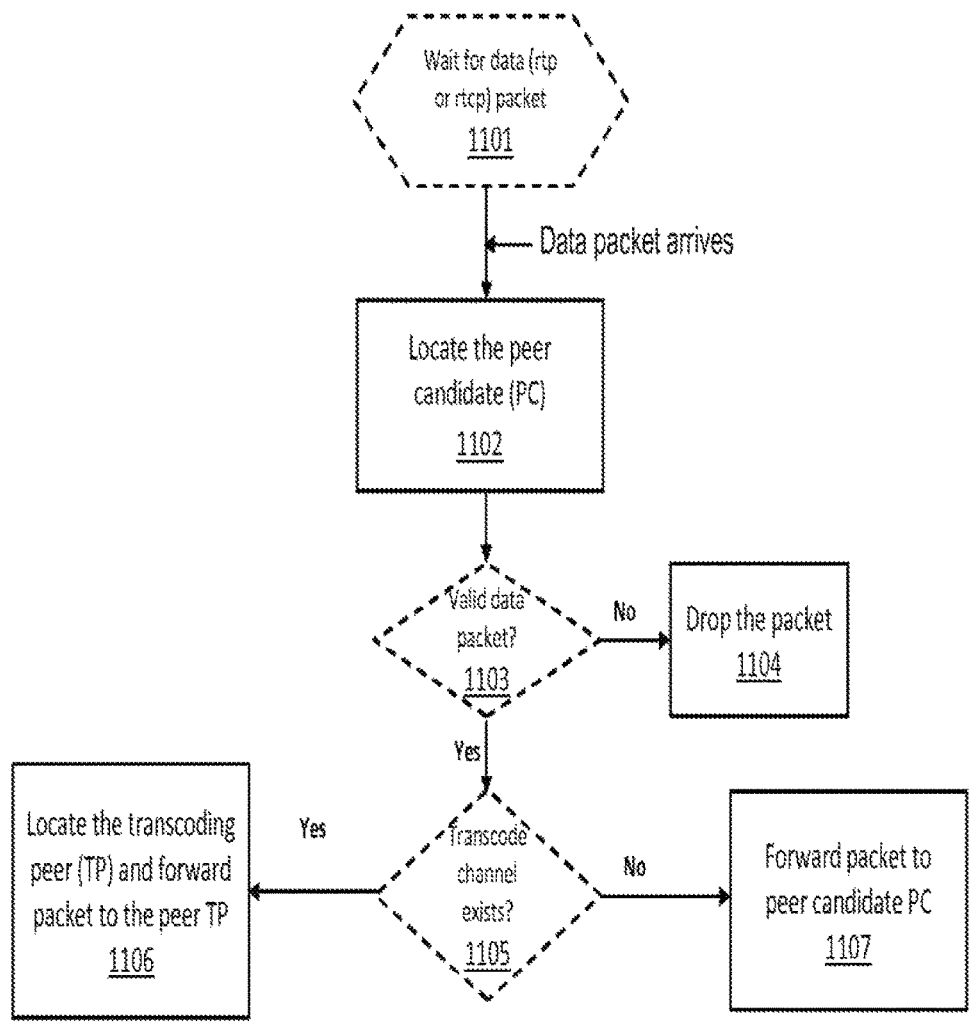
FIG. 11 illustrates a flow chart of an exemplary process employed by an ICE reactor for forwarding data packets once ICE connectivity has been established, according to one embodiment.

FIG. 11 illustrates a flow chart of an exemplary process employed by an ICE reactor for forwarding data packets once ICE connectivity has been established, according to one embodiment. The ICE reactor (reactor) waits for data (e.g., rtp or rtcp) packets (at 1101). The ICE reactor is set up for each local port that is configured for a specific call. Once a data packet arrives at the port, the ICE reactor (or rather RS) knows which call it is for and based on that information, the ICE reactor finds the peer candidate (PC) (at 1102). Next, the reactor determines whether the data packet is valid (at 1103). The determination may be made based on industry standards regarding whether the packet is a valid rtp/rtcp packet. If the data packet is determined to be invalid, the data packet is dropped (at 1104). If the data packet is determined to be valid, the reactor then determines whether a transcode channel exists (at 1105). If a transcode channel exists, the reactor locates the transcoding peer (TP) and forwards the data packet to the peer TP (at 1106). If a transcode channel doesn't exist, the reactor forwards the data packet to the PC (at 1107).

Figure 12:
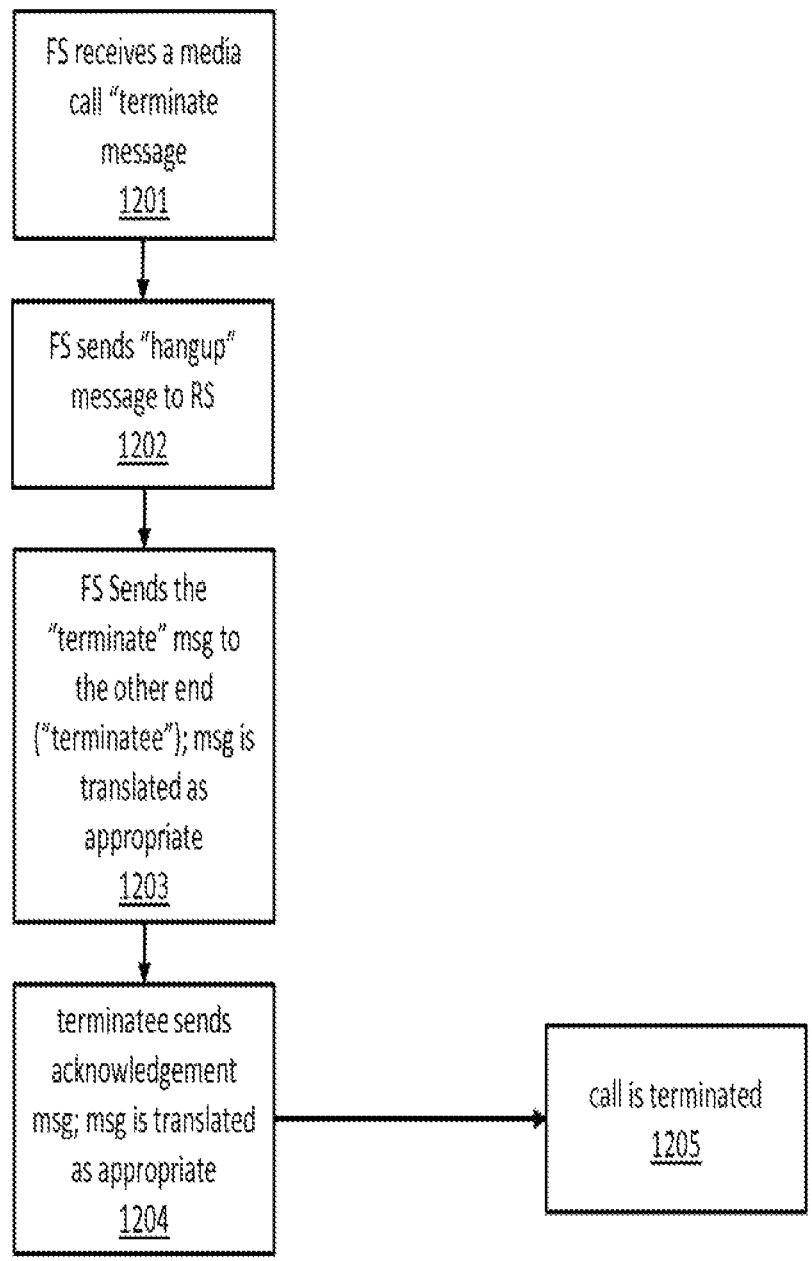
FIG. 12 illustrates a flow chart of an exemplary process employed by a federation server for terminating a media call, according to one embodiment.

FIG. 12 illustrates a flow chart of an exemplary process employed by a federation server for terminating a media call, according to one embodiment. The process begins when the federation server (FS) receives a media call terminate message from a caller or a callee ("terminator") (at 1201). In response, the FS sends a hang-up message to the relay server (RS) (at 1202). Next, the FS sends the terminate message to the "terminatee" (e.g., the other party to the call who did not originate the terminate message) (at 1203). If the terminator and the terminatee employ different UC systems, the message may need to be translated appropriately as described earlier in this disclosure (e.g., terminator UC format←−→common language←−→terminate format) prior to being sent. In response to the terminate message, the terminatee sends an acknowledgement message back to the terminator through the FS (at 1204). Again, appropriate translation of the message by the FS may be necessary. After receiving the acknowledgement message, the terminator finishes the call tear down sequence and the call is terminated (at 1205).

Figure 13:
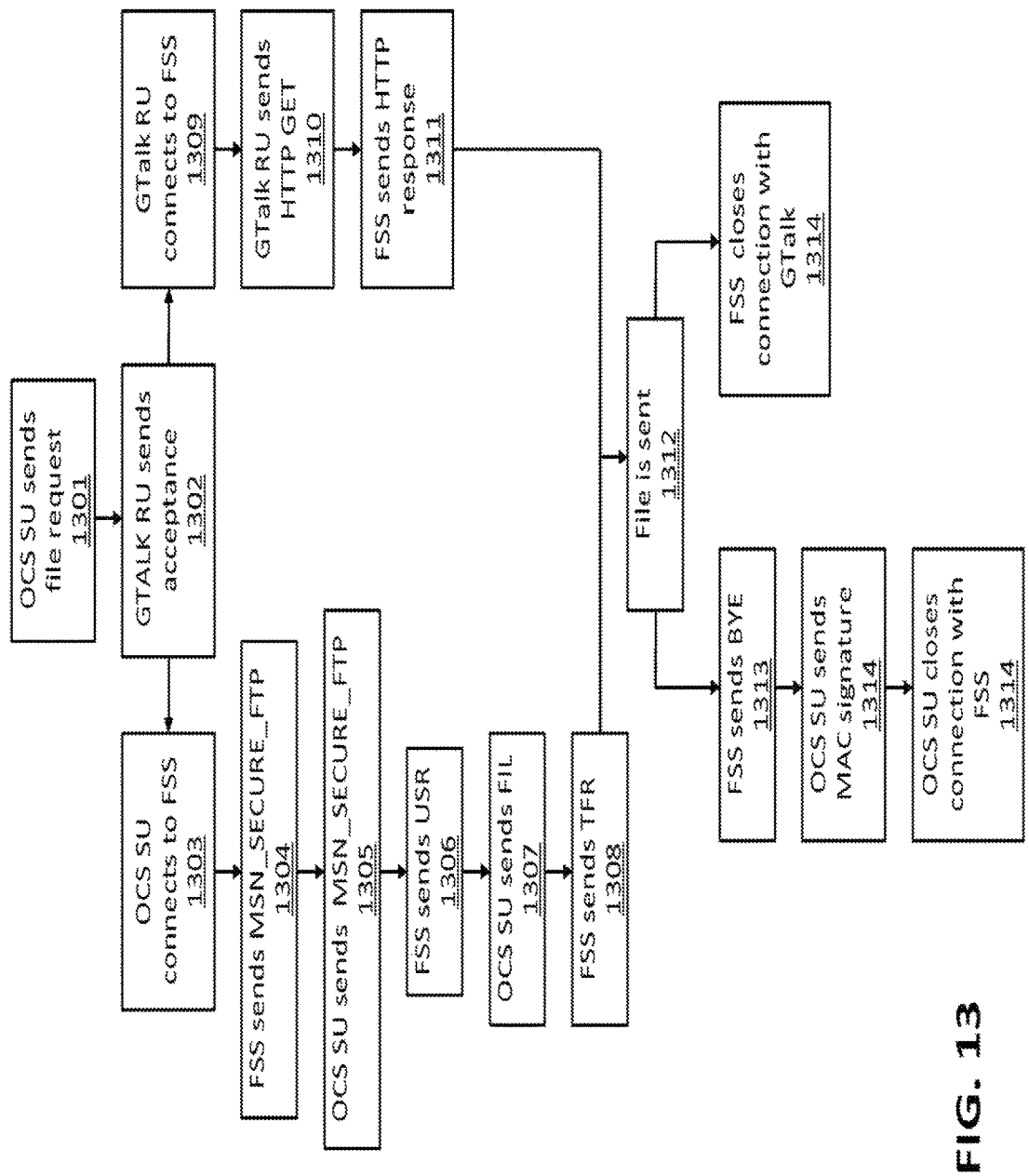
FIG. 13 illustrates a flow chart of an exemplary process for transferring a file from an OCS user to a GTalk user, according to one embodiment.

FIG. 13 illustrates a flow chart of an exemplary process for transferring a file from an OCS user to a GTalk user, according to one embodiment. File transfer is handled by a hub and a file share server (FSS) as follows. When an OCS sending user (OCS SU) wants to send a file a request is sent to the hub (at 1301) and processed by a FS as illustrated in FIG. 6. The hub relays the request to the receiving GTalk user (GTalk RU). Once the GTalk RU accepts the request, an acceptance message is sent back through the hub to the OCS SU (at 1302). The acceptance message is again processed by a FS as illustrated in FIG. 6. Next, both the OCS SU and the GTalk RU connect to the FSS via TCP (at 1303 and 1309, respectively). TCP is the common protocol over which UC specific protocols such as TFTP and HTTP are implemented.

After OCS SU connects successfully to the FSS, the FSS sends to the OCS SU a signal indicating the protocol that will be used (e.g., VER MSN_SECURE_FTP) (at 1304). The OCS SU replies to the FSS with the same string indicating the protocol (at 1305). After GTalk RU connects successfully to the FSS, the GTalk RU sends to the FSS an HTTP GET to request the file (at 1310). In response, the FSS sends an HTTP Response (at 1311).

The FSS sends the OCS SU a USR signal for authentication (at 1306). If the USR signal is valid, the OCS SU sends back to the FSS a FIL signal that indicates the file size (at 1307). Next, the FSS sends a TFR signal to the OCS SU (at 1308). Next, the OCS SU sends the file to the FSS while the FSS sends the file to the GTalk RU (at 1312). Because the FSS knows the file size, the FSS knows when a file has finished transferring and sends a BYE signal to the OCS SU indicating a complete transfer (at 1313). Next the OCS SU sends a MAC signature to the FSS to check the transfer (at 1314). Finally, the OCS SU closes the connection with the FSS (at 1315) and the FSS closes the connection with the GTalk RU (at 1316).

Figure 14:
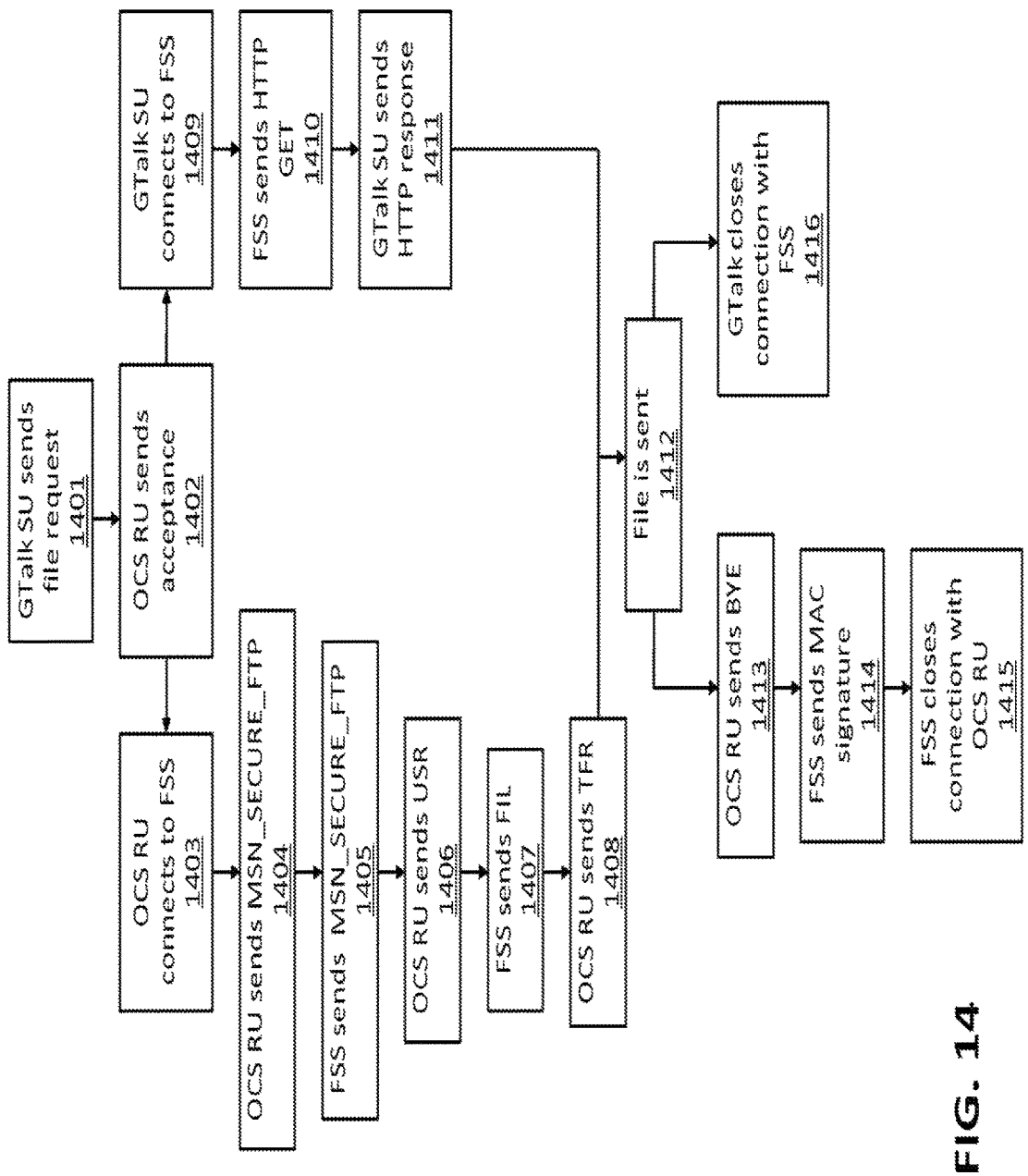
FIG. 14 illustrates a flow chart of an exemplary process for transferring a file from an GTalk user to an OCS user, according to one embodiment.

FIG. 14 illustrates a flow chart of an exemplary process for transferring a file from an GTalk user to an OCS user, according to one embodiment. File transfer is handled by a hub and a file share server (FSS) as follows. When a GTalk sending user (GTalk SU) wants to send a file, a request is sent to the hub (at 1401) and processed by a FS as illustrated in FIG. 6. The hub relays the request to the receiving OCS user (OCS RU). Once the OCS RU accepts the request, an acceptance message is sent back through the hub to the GTalk SU (at 1402). The acceptance message is again processed by a FS as illustrated in FIG. 6. Next, both the GTalk SU and the OCS RU connect to the FSS via TCP (at 1403 and 1409, respectively). TCP is the common protocol over which UC specific protocols such as TFTP and HTTP are implemented.

After GTalk SU connects successfully to the FSS, the FSS sends to the GTalk SU an HTTP GET to request the file (at 1410). In response, the GTalk SU sends an HTTP Response (at 1411). After OCS RU connects successfully to the FSS, the OCS RU sends to the FSS a signal indicating the protocol that will be used (e.g., VER MSN_SECURE_FTP) (at 1404). The FSS replies to the OCS RU with the same string indicating the protocol (at 1405).

The OCS RU sends a USR signal to the FSS for authentication (at 1406). If the USR signal is valid, the FSS sends back to the OCS RU a FIL signal that indicates the file size (at 1407). Next, the OCS RU sends a TFR signal to the FSS (at 1408). Next, the GTalk SU sends the file to the FSS while the FSS sends the file to the OCS RU (at 1412). Because the OCS RU knows the file size, the OCS RU knows when a file has finished transferring and sends a BYE signal to the FSS indicating a complete transfer (at 1413). Next, the FSS sends a MAC signature to the OCS RU to check the transfer (at 1414). Finally, the FSS closes the connection with the OCS RU (at 1415) and the GTalk SU closes the connection with the FSS (at 1316).

Local Domain Configurations

In order for UC systems to communicate with each other through a hub, the local domain administrators of the UC systems need to properly configure their systems so that communications traffic intended for a receiving UC system is directed to the hub. For instance, in a clearinghouse or hub implementation, a domain gateway is typically implemented. The domain gateway is a component that allows the UC system to communicate with the hub. In order for a UC system to communicate with the hub, both the domain gateway and the UC system need to be configured properly.

Figure 15:
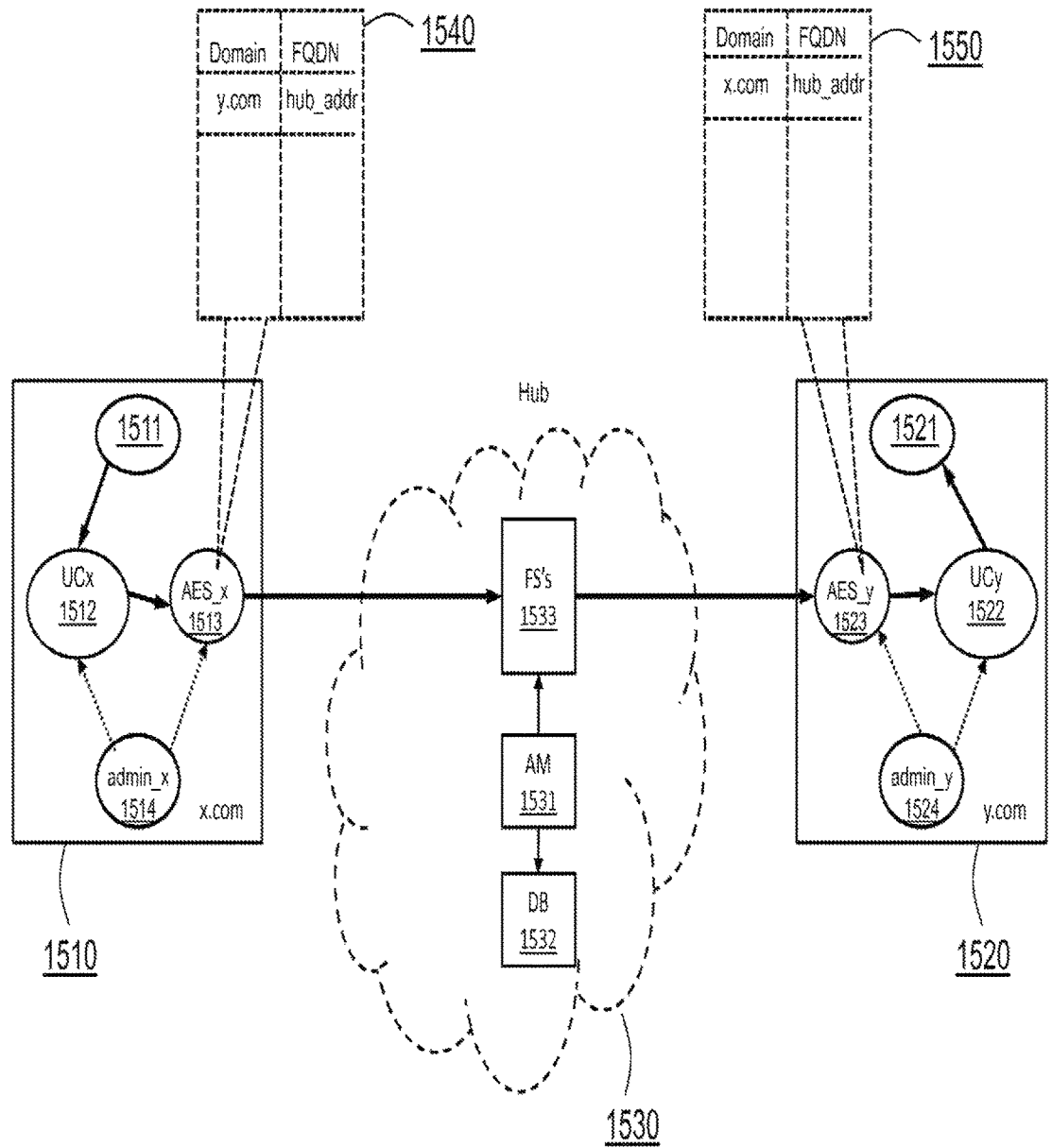
FIG. 15 illustrates a block diagram that traces an exemplary transmission of a message through a hub and domain gateways, according to one embodiment.

FIG. 15 illustrates a block diagram that traces an exemplary transmission of a message through a hub and domain gateways, according to one embodiment. Assume user 1511 wants to send a message to user 1521. User 1511 first sends the message to the local UC system 1512. The message is then forwarded to domain gateway 1513 (e.g., Access Edge Server (AES), Same Time Gateway, etc) which maintains an allow list 1540 of all the domains the local domain administrator 1514 has allowed its users to have access to. This way, local domain administrators have control over which domains its users can communicate with. Additionally, the allow list can be used allow or disallow communication with federated domains. Another useful function of the allow list is to provide UC address information for federated domains.

In order to route communications traffic that is intended for domain "y.com" (1520) to the hub 1530, the allow list 1540, specifically the FQDN field in the entry for domain "y.com" (1520), needs to include the address of the hub 1530 ("hub_addr"), Furthermore, the hub 1530 must also be properly configured by the hub administrator, who must add both domains ("x.com" and "y.com") to the hub 1530 through the AM 1531. Once the hub administrator has configured the AM 1531 and the AM 1531 has updated the data store in the DB 1532, the hub 1530 is ready for use and all traffic to and from "x.com" to "y.com" will flow through the hub 1530.

The routed traffic includes the message that was sent by 1511. After being processed by the hub 1530, the message is forwarded to domain gateway 1523, then to UC system 1522, and finally to user 1521. As FIG. 15 illustrates, the FQDN field in the entry for domain "x.com" in allow list 1550 also needs to include the address of the hub 1530 ("hub_addr"). As such, traffic intended for the domain "x.com" (1510) is also routed through the hub 1530.

Figure 16:
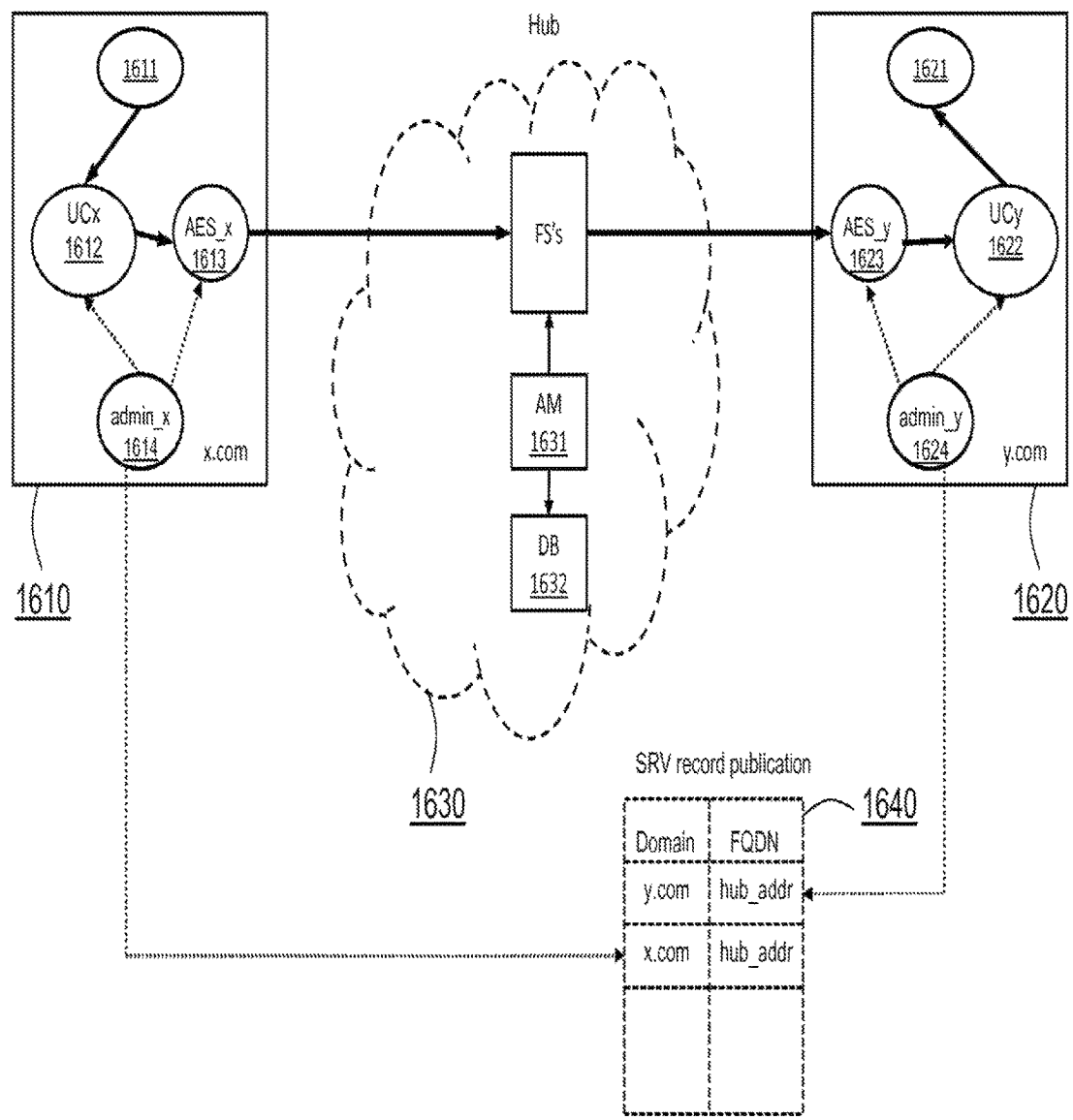
FIG. 16 illustrates a block diagram that traces an exemplary transmission of a message through a hub using SRV record publication, according to one embodiment.

FIG. 16 illustrates a block diagram that traces an exemplary transmission of a message through a hub using SRV record publication, according to one embodiment. Assume user 1611 wants to send a message to user 1621. User 1611 first sends the message to the local UC system 1612. Next, the message is sent to domain gateway 1613 and is intended to be transmitted to domain "y.com" (1620). However, because the local administrators 1614 and 1624 have published the SRV records for domains "x.com" (1610) and "y.com" (1620), respectively, with the FQDN fields set as "hub_addr", as shown in SRV record publication 1640, all communications traffic that is intended for domains "x.com" and "y.com" 1620 will be routed to the hub 1630. In order for the hub 1630 to handle the routed traffic, both domains ("x.com" and "y.com") need to be added to the hub 1630 through the AM 1631. As FIG. 16 illustrates, the routed traffic includes the message that was sent by 1611. After being processed by the hub 1630, the message is forwarded to the domain gateway 1623, then to the UC system 1622, and finally to user 1621.

SRV records enable a domain (e.g., foo.com) to become part of the hub without asking other domains to configure their gateways/allow lists to add the domain in order to direct traffic to the hub. Accordingly, using SRV records for multiple protocols along with the support for those, multiple protocols in the hub enable a domain (e.g., foo.com) to appear as different UC systems. For instance, by publishing an SRV record for the respective protocol, foo.com may appear as an OCS system to other OCS partners, and at the same time, foo.com may appear as a XMPP system to XMPP partners.

The SRV record requirement varies among UC'systems based on the UC protocol used by the UC system or even within that UC protocol a vendor may have a specialized SRV record requirement. A feature of the hub is that the administrator of a domain (e.g., "y.com") can publish SRV records for all the UC system types that can federate (via the hub) with the domain (e.g., "y.com"). All these SRV records would point to the address for the hub (e.g., "hub.addr"). For instance, if "x.com" is an OCS UC system, then it would look up _sipfederationtis._tcp.y.com to federate with "y.com". If "z.com" is a Jabber UC system, then it would look up _xmpp-server._tcp.y.com to federate with "y.com." While "y.com" is a certain UC type (e.g., Sametime) but because of the SRV record publication and the hub, "y.com" appears as an OCS UC system to "x.com" and as Jabber UC system to "z.com".

Figure 17:
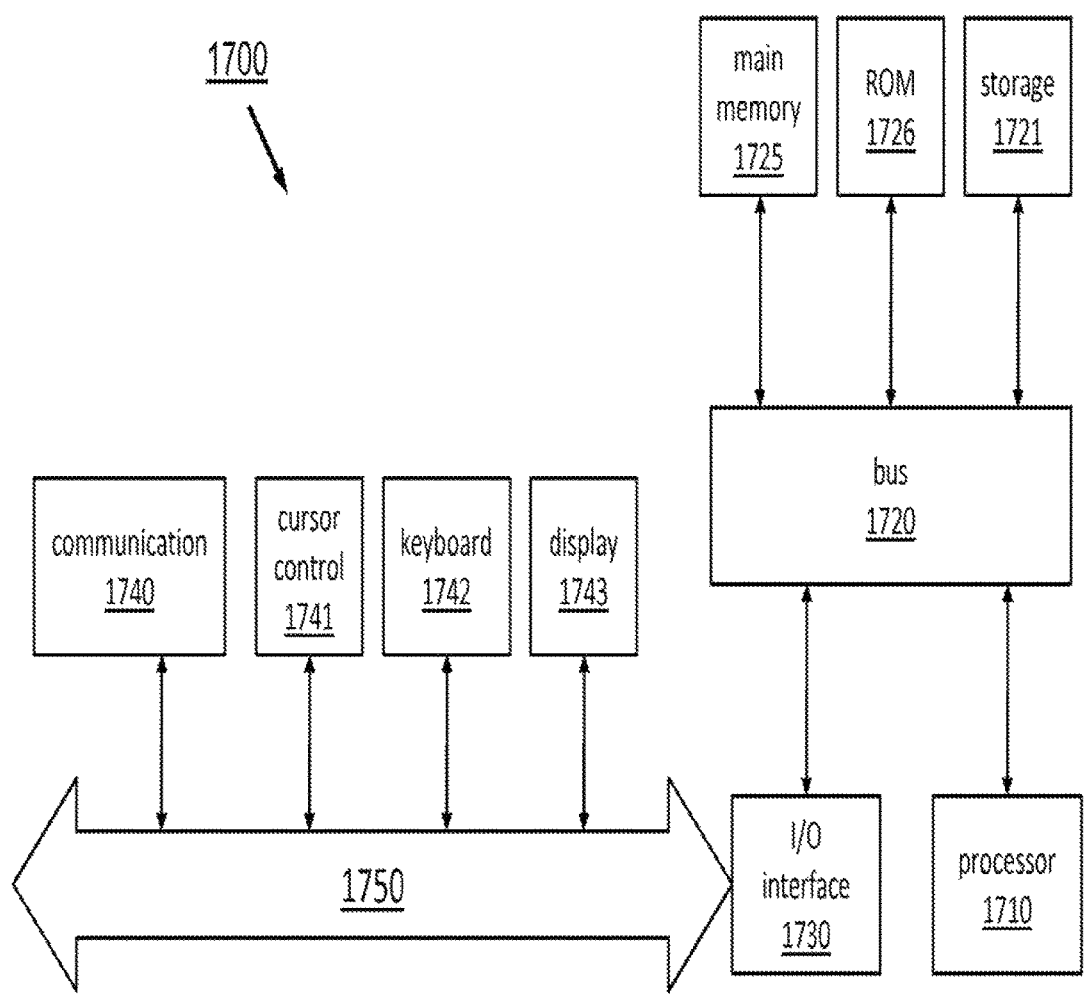
FIG. 17 illustrates an exemplary computer architecture for use with the present system, according to one embodiment.

FIG. 17 illustrates an exemplary computer architecture that may be used for the present system, according to one embodiment. The exemplary computer architecture may used for implementing one or more components described in the present disclosure including, but not limited to, a hub system, a load balancer, a database, an administrator module, a federation server, a user client, a relay server, a transcoder, a file sharing server, and a UC system. One embodiment of architecture 1700 comprises a system bus 1720 for communicating information, and a processor 1710 coupled to bus 1720 for processing information. Architecture 1700 further comprises a random access memory (RAM) or other dynamic storage device 1725 (referred to herein as main memory), coupled to bus 1720 for storing information and instructions to be executed by processor 1710. Main memory 1725 also may be used for storing temporary variables or other intermediate information during execution of instructions by processor 1710. Architecture 1700 may also include a read only memory (ROM) and/or other static storage device 1726 coupled to bus 1720 for storing, static information and instructions used by processor 1710.

A data storage device 1725 such as a magnetic disk or optical disc and its corresponding drive may also be coupled to architecture 1700 for storing information and instructions. Architecture 1700 can also be coupled to a second I/O bus 1750 via an I/O interface 1730. A plurality of I/O devices may be coupled to I/O bus 1750, including a display device 1743, an input device (e.g., an alphanumeric input device 1742 and/or a cursor control device 1741).

The communication device 1740 allows for access to other computers (e.g., servers or clients) via a network. The communication device 1740 may comprise one or more modems, network interface cards, wireless network interfaces or other interface devices, such as those used for coupling to Ethernet, token ring, or other types of networks.

Advanced Alias Domain Routing

According to one embodiment, the present system provides advanced alias domain routing to map real addresses to alias addresses and vice versa. According to one embodiment advanced alias domain routing, is implemented through a routing engine at a Federation Server (FS) to federate multiple disparate UC platforms.

According to one embodiment, a routing engine resides at a federation server as part of a hub described with reference to FIG. 4. According to another embodiment, a routing engine resides at a federation server as part of an on-premise installation of the federation server at, for example, a client site (and is not limited to the hub configuration).

Advanced alias domain routing enables users to work together as if they were served by the same UC, sharing presence, sending and receiving instant messages, participating in multi-party chat and making voice calls. According to one embodiment, advanced alias domain routing uses mapping of address data to accomplish a desired result. Alias address to real address mapping and/or real address to alias address mapping are performed on data sources that have been pre-configured with a real address correlating to one or more alias address counterpart. The data source not only provides the mapping between real addresses and the alias address, but in addition also provides the list of domain names for which address routing should be done. The list of domain names is used during reverse lookup to identify which domain's mapping data source alias is to be used, especially where more than one alias option may be available.

Objects and advantages of advanced alias domain routing include:

A) Domain Sharing: Domain Sharing allows two or more UC servers to be federated (internally or externally) while sharing the same domain name. This feature is mostly used by organizations that need to maintain two UC solutions, or are in the process of migrating from one to another.

B) Single Domain Routing (SDR): Single Domain Routing allows messages addressed to a single external domain to be routed to the appropriate internal UC servers. For example, where there are multiple domains that wish to Federate with the outside world and appear as if they were a single domain, Single Domain Routing is a solution.

C) Multi-Aliasing: Multi-Aliasing allows internal users to be migrated from one UC solution to another without affecting the externally federated colleagues by supporting the old UC addresses as aliases for the new address.

D) Reverse Aliasing: Reverse aliasing allows a common alias address to be resolved to any one from a set of real addresses depending on the peer address. As an example, consider a company BTT (with domain btt.com) that has recently acquired another company ZCOM (with domain zcom.com) and uses a common support address support@btt.com but maintains 2 different support staff to serve respective customers of BTT and ZCOM. Since fred@gtech.com has been a customer of BTT when he contacts support@btt.com his UC message should go to BTT's older support address (say support1@btt.com). Whereas james@bogle.com was a customer of ZCOM so when he contacts support@btt.com his UC message should go to ZCOM's legacy support address support@zcom.com.

Figure 18:
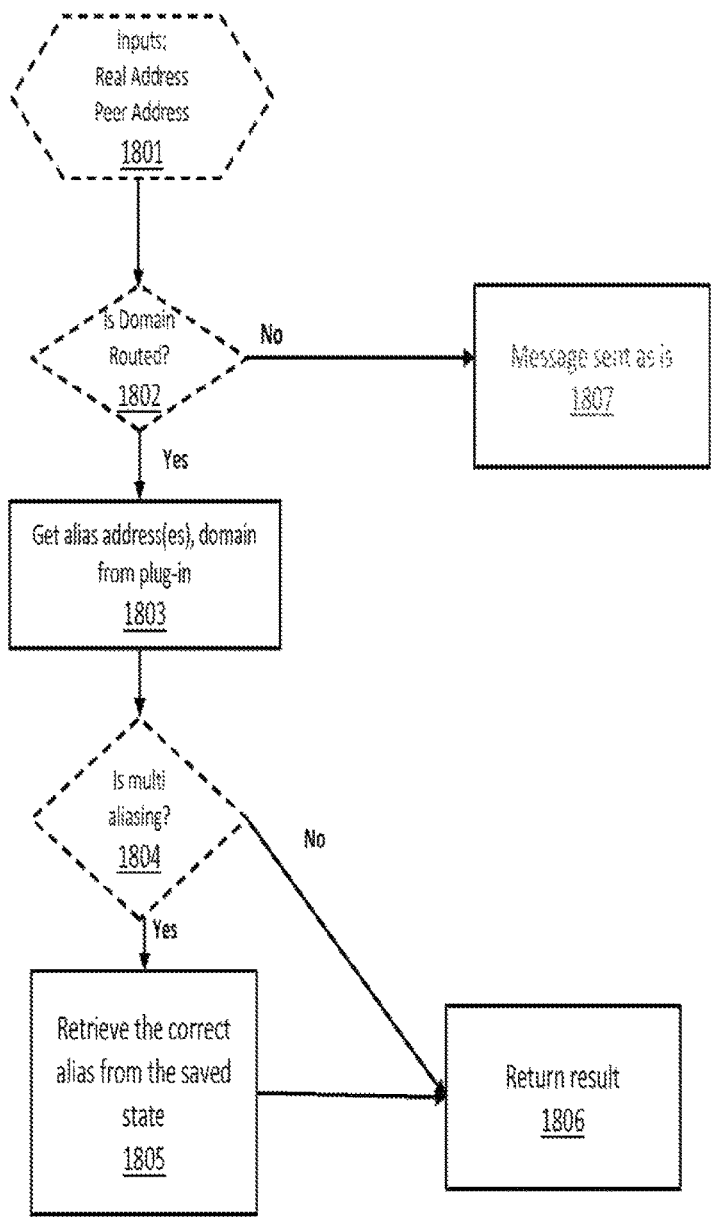
FIG. 18 illustrates an exemplary process for mapping ea to alias addresses for use with the present system, according to one embodiment.

FIG. 18 illustrates an exemplary process for mapping real to alias addresses for use with the present system, according to one embodiment. Upon receiving a real address and a peer address as inputs (1801), whether the domain is routed is determined (1802). If not there is no need to perform a mapping and the message is sent as is (1807). If the domain is routed then the alias address (or multiple addresses), as defined above, is retrieved from the plug-in managing the routed domain (1803). In order to determine the proper alias address, since more than one may be available, the next step is to determine if multi aliasing is being performed (1804). If so, then the correct alias address is retrieved by looking up the existing alias address-peer address mapping that was saved (1805). If not, the alias address, which is the only alias address, is returned (1806). Thus, according to one embodiment, a single alias address is returned which is the proper address for the message to be routed to or from.

Figure 19:
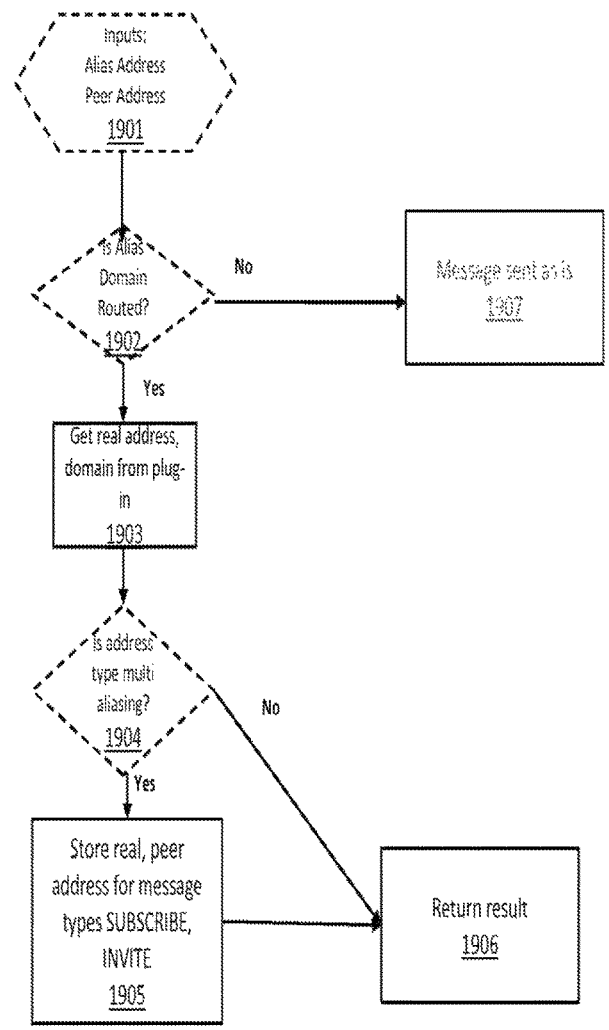
FIG. 19 illustrates an exemplary process for mapping alias to real addresses for use with the present system, according to one embodiment.

FIG. 19 illustrates an exemplary process for mapping alias to real addresses for use with the present system, according to one embodiment. Upon receiving as inputs an alias address and a peer address (1901), whether the alias domain is routed is determined (1902). If it is not, the alias address is the real address and no routing needs to be done (1907). If the alias domain is routed, then the real address is retrieved from the plug-in managing the routed domain (1903). Whether the address type is multi aliasing is then determined (1904). If it is not, then the real address that is maintained on the list is returned (1906). Otherwise, if address type is multi aliasing, then the mapping of the alias and peer address for message types of Subscribe or Invite are saved (1905) so that the appropriate real address to alias address mapping can be performed later. After storing the mapping, the real address is returned (1906). According to one embodiment, domain sharing is enabled between two UC systems. The address of a user gets changed from a real to alias address and vice-versa for the purposes of the message being able to come out of the UC boundary and also to determine which UC a specific user belongs to. Two exemplary implementations of domain sharing described herein are list based and rule based. In both implementations the routing is based on a user's UC address.

Figure 20:
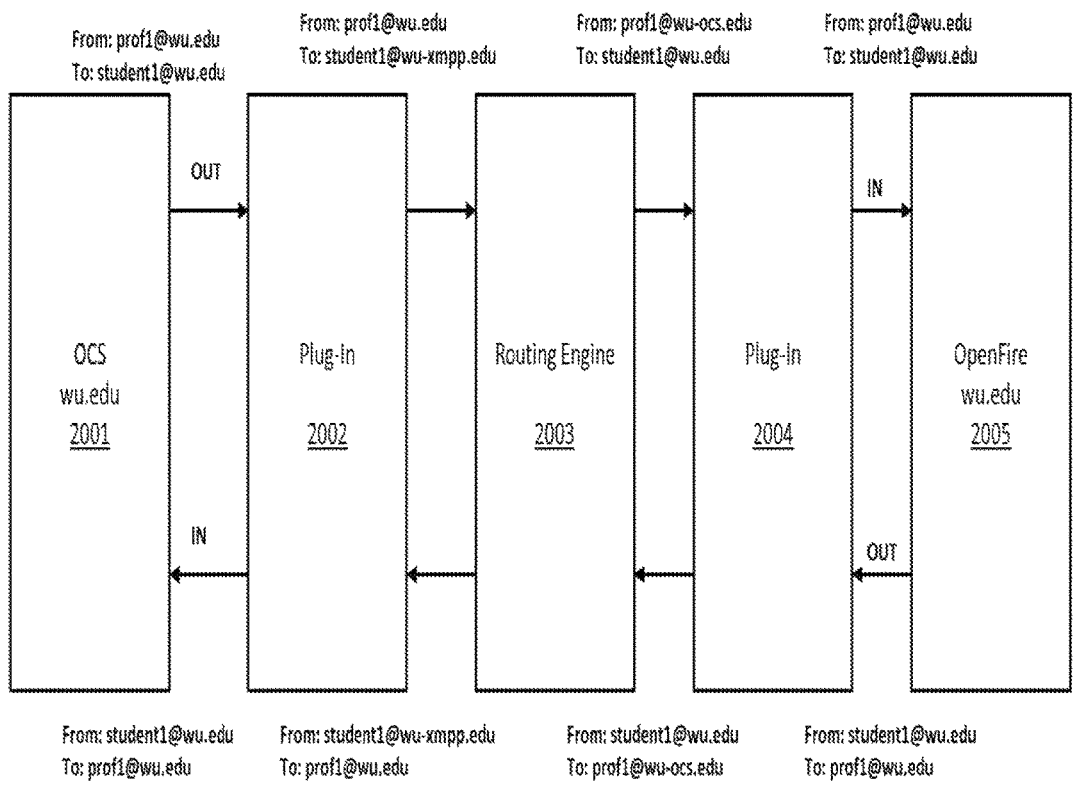
FIG. 20 illustrates an exemplary process for list based domain sharing for use with the present system, according to one embodiment.

FIG. 20 illustrates an exemplary process for list based sharing for use with the present system, according to one embodiment. FIG. 20 is best understood when considered using the following example involving a fictional university Wonder University. Wonder University deployed OCS inside the University for their Faculty and existing students and uses the domain wu.edu (2001). The student population keeps growing and adding OCS licenses for the students continues to be expensive. As a result, Wonder University has decided to use OpenFire UC for all the new students and also move the existing students from OCS. They would like to use the same domain wu.edu for OpenFire also (2005) and would like faculty and students to have the ability to talk to each other. The problem is that UC's don't send out messages addressed to the same domain name outside of the UC boundary.

For example, consider a particular Faculty member, prof1@wu.edu, running on OCS and a particular Student, student1@wu.edu, running on Google Apps. A message from prof1@wu.edu to student1@wu.edu is blocked by the Edge server since it considers this as an internal domain which cannot be forwarded. Also, this issue occurs when a message is sent from student1@wu.edu to prof1@wu.edu. A similar issue exists with other UC's like Jabber, Sametime, Google Apps, and Webex.

According to one embodiment, the present system maintains a list, (herein, "the list"), with reciprocally corresponding categories of users and domains, that facilitate mapping in routing engine (2003). Similarly, the same list exists on the UC with a software program to do simple mapping on that list (herein "plug-in") on the UC. The plug-in (2002) that is installed on the UC renames the domains in the 'To' address so that they will be sent out of the UC boundary. In this case the student1@wu.edu is renamed by the plug-in to student1@wu-xmpp.edu (2002). This message reaches the routing engine (2003) and the routing engine looks up its mapping, via the list, to determine the actual domain of student1 and rewrites the address back to student1@wu.edu before sending, it along, to the OpenFire UC. Similarly the 'From' address prof1@wu.edu is renamed by a plug-in (2004) to prof1@wu-ocs.edu before reaching the OpenFire UC (2005) so that it accepts the incoming message. List based domain sharing is advantageous in this implementation in that is totally invisible to end users. There are drawbacks however, in that the same user name is not allowed on multiple UC's; not all UC's are supported; and the plug-in must be installed in each local UC so messages sent locally will go out and not look internally causing messages to be routed improperly. The plug-in works either by (1) using a list of local users on the same domain, or (2) by using a list of remote users inside a routing engine to properly route the message.

Figures 21A, 21B:
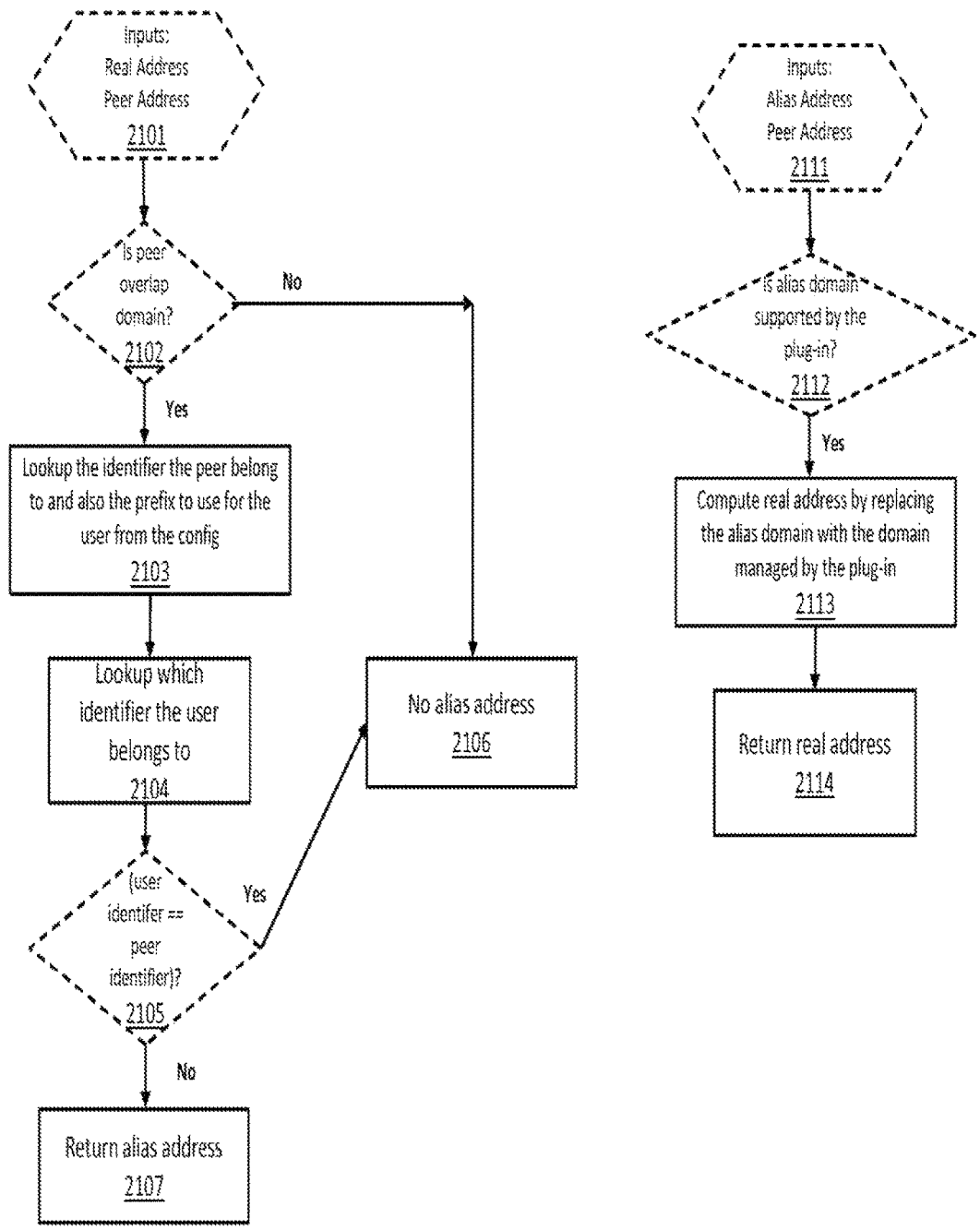
FIGS. 21A and 21B illustrate exemplary list based domain sharing plug-in processes for use with the present system, according to one embodiment.

FIGS. 21A and 21B illustrate exemplary list based domain sharing plug-in processes for use with the present system, according to one embodiment. According to one embodiment, each of the domains participating in domain sharing are given an identifier. The plug-in is initialized with a list of users and which identifier they belong to and also the domains supported by the plug-in. In FIG. 21A, an alias address is computed from a real address. Upon receiving a real address and a peer address as inputs (2101), a determination is made to see whether the peer address is in the shared domain (2102). If not, then there is no alias address (2106) since it is not in the shared domain and the real address that was taken as an input is used to handle the message. If the peer address is in the shared domain, the identifier is looked up to determine the domain that the peer belongs to and also the prefix used for the user from the configuration (2103). Which identifier the user belongs to is then looked up (2104). If the user identifier is the same as the peer identifier (2105), then there is no alias address and the real address is returned (2106). If the user identifier is not the same as the peer identifier (2105), then the alias address is computed using the real address and peer address as inputs to the process described in FIG. 18 above, and the alias address is returned (2107).

In FIG. 21B, a real address is computed from an alias address. Upon receiving as inputs an alias address and a peer address (2111), the alias domain is checked for support by the plug-in (2112). If the alias domain is supported by the plug-in, then the real address is computed by replacing the alias domain with the domain managed by the plug-in (2113) and the real address is returned (2114).

Figure 22:
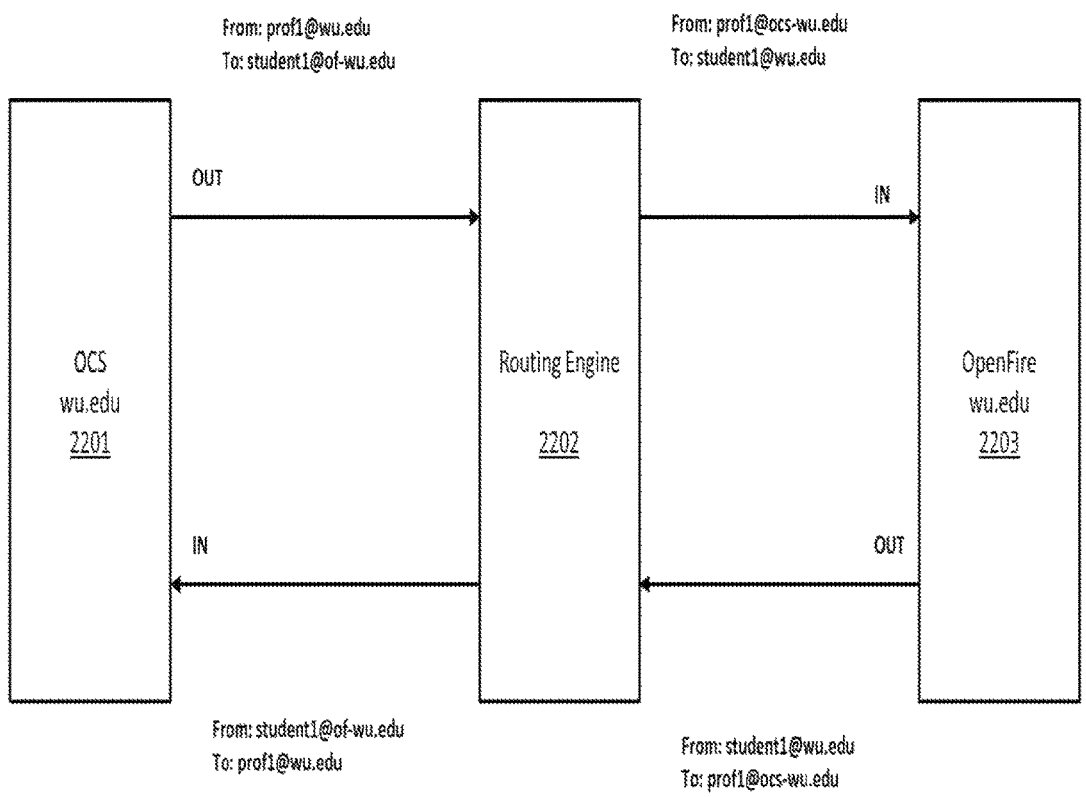
FIG. 22 illustrates an exemplary process for rule based domain sharing for use with the present system, according to one embodiment.

FIG. 22 illustrates an exemplary process for rule based domain sharing for use with the present system, according to one embodiment. In a similar use case as the list based domain sharing Wonder University referenced above, Wonder University decides that they do not want to modify the UC infrastructure by installing plug-ins or the UC does not support plug-ins. Wonder University is, however, ok with users on each UC address and the users on the other UC using an alias which is specified as a rule.

A rule created in this example is a prefix rule indicating that if a user is addressed with an 'of-' prefix to the domain name, it corresponds to the user on the OpenFire, and if a user is addressed with an "ocs-" prefix to the domain name, it corresponds to the user on the OCS. If there are more than two UC's that are sharing a domain or if there is a need to use the same prefix on both sides, then the rule based domain sharing can be augmented with a list to implement combined rule/list based domain sharing.

According to one embodiment, an administrator configures domain sharing by creating a shared domain in a routing engine (2202) that supports advanced alias domain routing by identifying the shared domain name, and necessary domain properties, giving each participating domain that wants to be included in the shared domain a unique identifier, and creating rules for each domain. In the example described in FIG. 22, there are 2 domains and so two rules are created: Rule 1: ocs-wu.edu for domain OCS.wu.edu (2201) and Rule 2: of-wu.edu for domain OpenFire.wu.edu (2203).

Figures 23A, 23B:
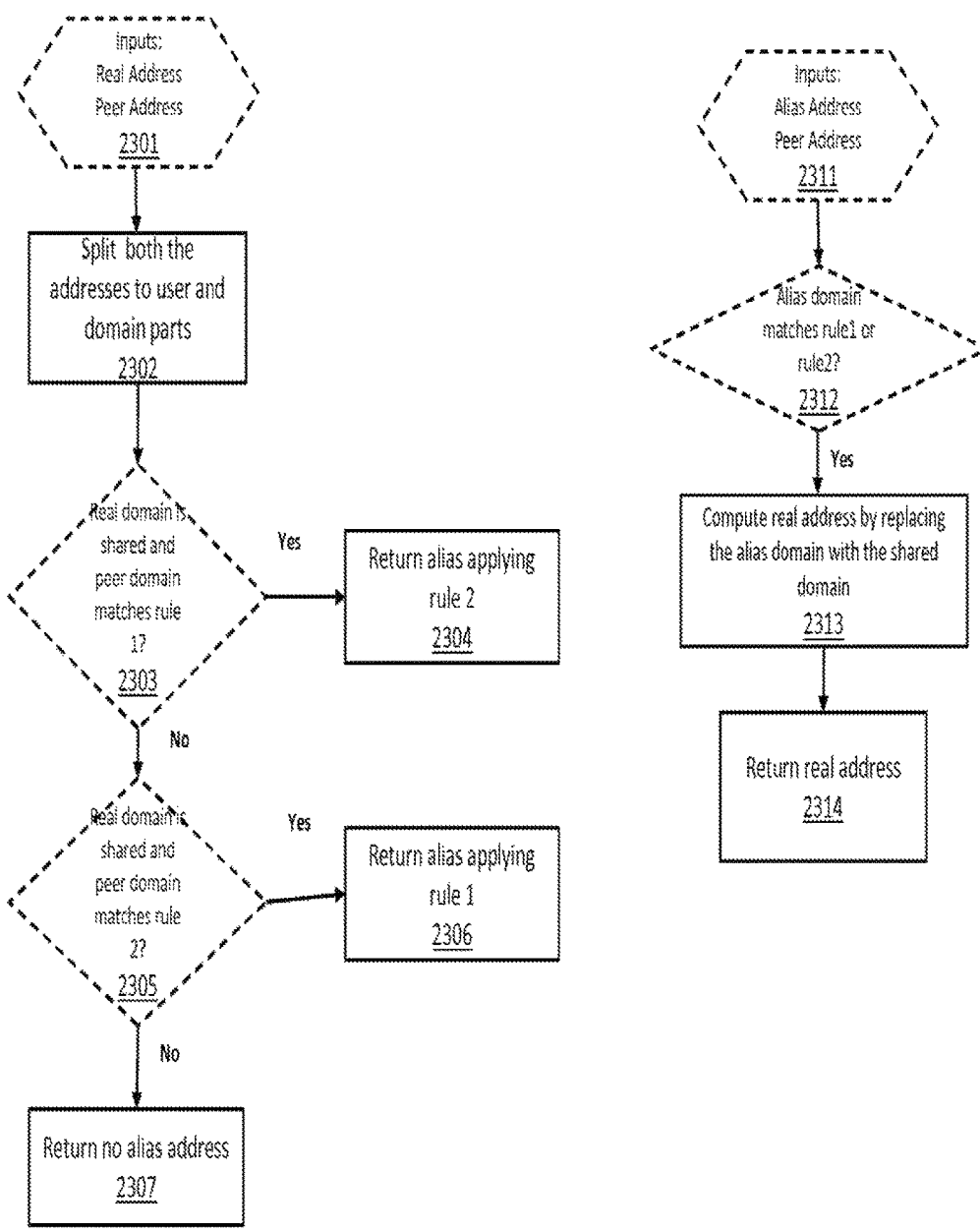
FIGS. 23A and 23B illustrate exemplary rule based domain sharing plug-in processes for use with the present system, according to one embodiment.

FIGS. 23A and 23B illustrate exemplary rule based domain sharing plug-in processes for use with the present system, according to one embodiment.

In FIG. 23A, an alias address is computed from a real address. Upon receiving a real address and peer address as inputs (2301), both the real and peer addresses are split into their user and domain parts (2302). If the real domain matches the shared domain and if the peer address is true for rule 1 (2303), then the alias address is returned by applying rule 2 (2304). If either the real domain is not shared or the Peer Address does not match Rule 1, then the process determines if the real domain is shared and the peer address matches rule 2 (2305), then the alias address is returned by applying rule 1 (2306). If either the real domain is not shared or the peer Address does not match rule 2, then there is no alias address (2307) and the peer address is returned and the message processed accordingly.

In FIG. 23B, a real address is computed from an alias address. Upon receiving an alias address and peer address as inputs (2311), whether the alias domain matches rule 1 or rule 2 is determined (2312). If it does not match either rule, then the alias address is the real address and the real address is returned (2314). If the alias domain matches either rule 1 or rule 2, the real address is computed by replacing the alias domain with the shared domain (2313) and the real address is returned (2314).

Figure 24:
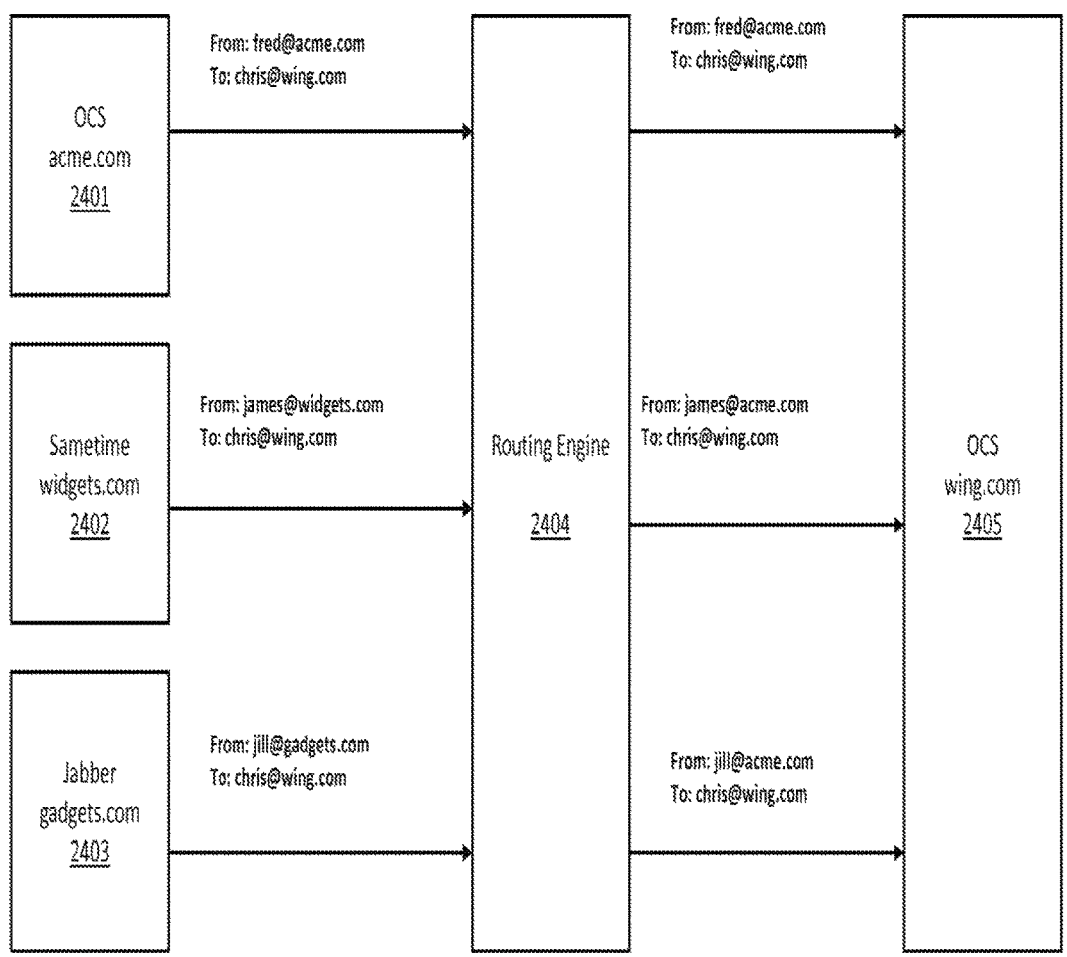
FIG. 24 illustrates an exemplary SDR message process for use with the present system, according to one embodiment.

FIG. 24 illustrates an exemplary single domain routing (SDR) message process for use with the present system, according to one embodiment. FIG. 24 is best understood when considering the following example that was described above. ACME acquires Widgets.com and Gadgets.com.

ACME uses an OCS UC, Widgets uses a Sametime UC and Gadgets uses a Jabber UC. A decision is made that all should appear as they are one company now after the acquisition and they would like to federate with the outside world as a single domain (2405). ACME (OCS) (2401)—is the source domain and all other domains are aliased to associate with this domain. Widgets (Sametime) (2402)—A user list is created in a Widgets file that assigns each user in a table to an alias user name at ACME. For example user_1@widgets.com in the table appears in the address field as user_1, and is assigned the alias of user_1@ACME.com. Thus messages sent to user_1@widgets.com or user_1@ACME.com from the outside world both reach the appropriate user. Gadgets (Jabber) (2403)—A user list is created in a Gadgets file that assigns each user in a table to an alias user name at ACME. For example user_1@Gadgets.com in the table appears in the address field as user_1, and is assigned the alias of user_1@ACME.com. Error checking is then performed to make sure that the same alias is not used among any of the single domain routing lists. Since user_1 is already used, the program generates an error and the administrator changes one of the two user_1 names to a different alias, i.e. user_2 so that messages are properly routed to that user. Thus messages sent to user_1@Gadgets.com or user_2@ACME.com from the outside world both reach the appropriate user, user_1@Gadgets.com in this case.

FIGS. 25A and 25B illustrate exemplary SDR plug-in processes for use with the present system according to one embodiment. In FIG. 25A, an alias address is computed from a real address. Upon receiving, a real address and peer address as inputs (2501), the process determines if the real domain is supported (2502). If it is not there is no alias address and the real address is returned (2505). If the real domain is supported, then the al as is looked up from the forward mapping (2503). If an alias is found (2504) then the alias address is returned (2506). If no alias is found (2504) then there is no alias address and the real address is returned (2505)

In FIG. 25B, a real address is computed from an alias address. Upon receiving an alias address and a peer address as inputs (2511), the process determines if the alias domain is supported by the plug-in (2512). If it is not supported then the alias address is the real address and the alias address is returned (2515). If it is supported then the real address is retrieved from the list (2513) and if found (2514) it is returned (2515). If the real address is not found on the list, then the alias address is the real address and it is returned (2515).

Figure 26:
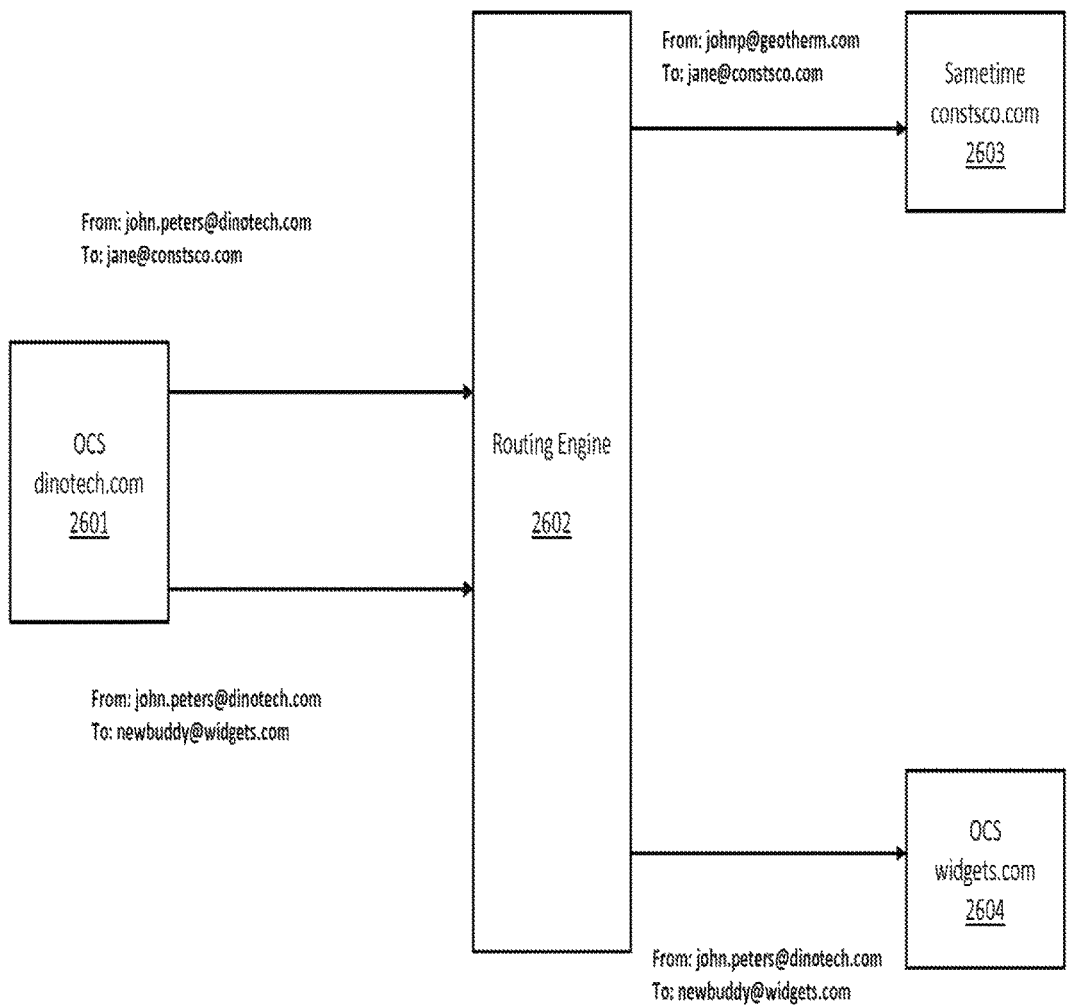
FIG. 26 illustrates an exemplary multi-aliasing message process for use with the present system, according to one embodiment.

FIG. 26 illustrates an exemplary multi-aliasing message process for use with the present system, according to one embodiment. FIG. 26 is best understood when considering again the example including GEOTHERM and DINOTECH described above (2601). An employee of GEOTHERM, John Peters, previously had the UC address johnp@geotherm.com. After the acquisition the user is moved to a DINOTECH UC server with the address john.peters@dinotech.com. A plug-in is initialized with the forward and reverse mapping of the real and alias addresses of all the users. A list is created on the routing engine (2602) with an identifier for each supported domain (2603 and 2604) and corresponding to a list of each of the users real and alias Addresses on the supported domains (2603 and 2604).

Figure 27A:
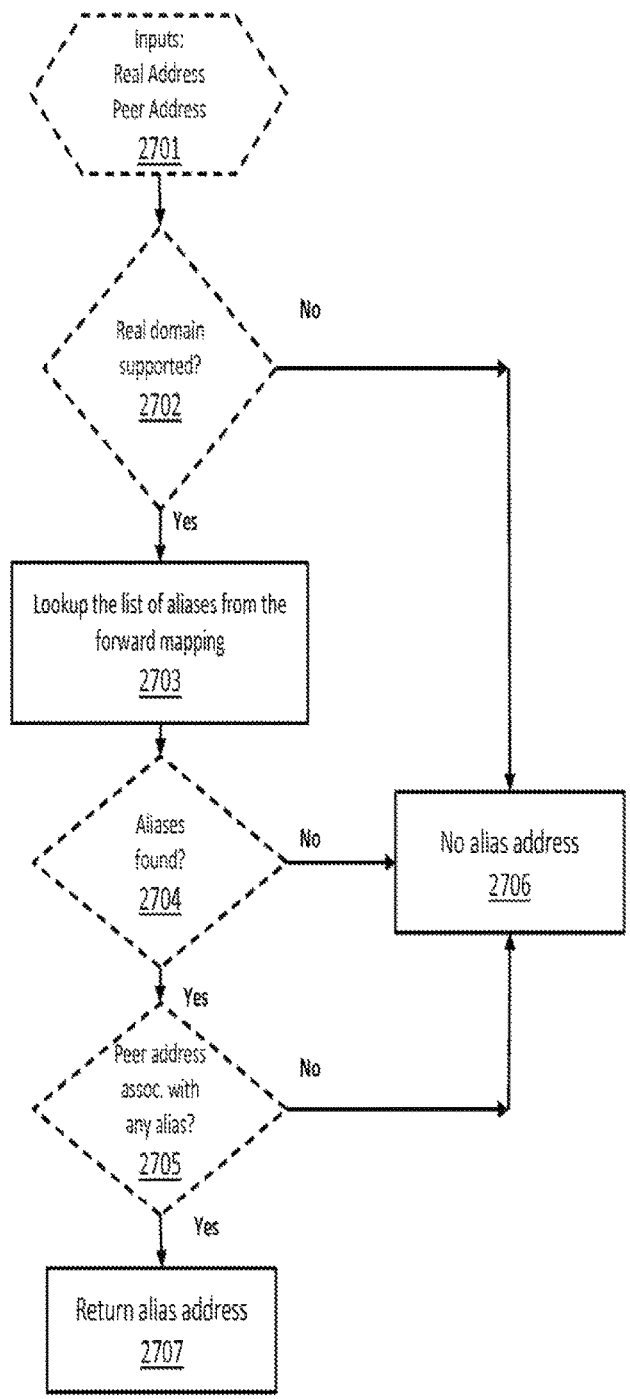
FIGS. 27A and 27B illustrate exemplary multi-aliasing plug-in processes for use with the present system, according to one embodiment.
Figure 27B:
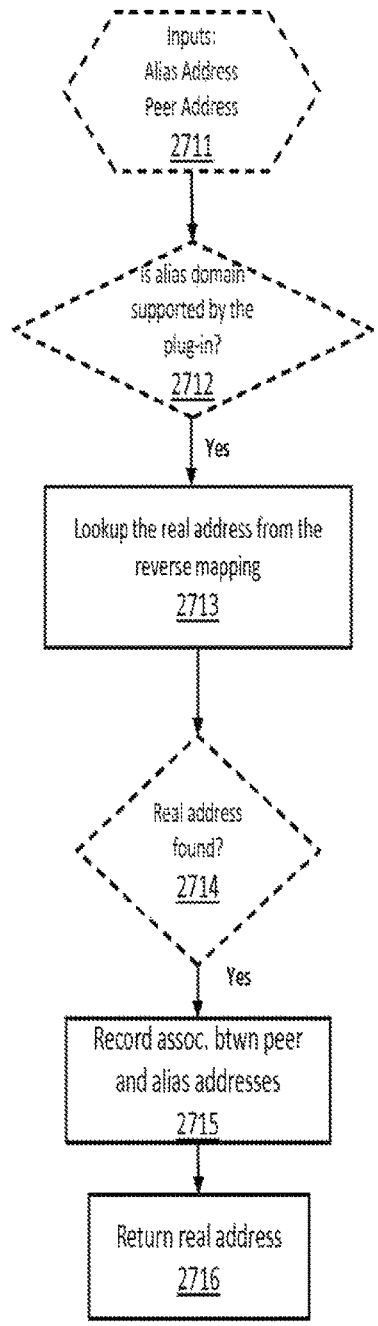

FIGS. 27A and 27B illustrate exemplary multi-aliasing plug-in processes for use with the present system, according to one embodiment. In FIG. 27A, an alias address is computed from a real address. Upon receiving a real address and a peer address as inputs (2701) the process determines if the domain corresponding to the real address is supported (2702). If it is not then there is no alias address and the real address is returned (2706). If the domain is supported, then the process looks up the list of aliases from the forward mapping (2703) and checks if a corresponding alias is found for the real address (2704). If not then there is no Alias Address and the real address is returned (2706). If there is a corresponding alias address found, the process determines if the peer address is flagged as associated with any of the alias addresses in the list (2705). If not then the real address is returned (2706). If the peer address is associated with an alias address, the corresponding alias address is returned (2707).

In FIG. 27B, a real address is computed from an alias address upon receiving an alias address and a peer address as inputs (2711). The process determines if the alias address corresponds to a domain that is supported by the plug-in (2772). If not, the alias address is the real address and the real address is returned (2716). If the domain is supported then the process looks up the real address from the reverse mapping (2713). If a real address is not found, then the alias address is the real address and it is returned (2716). If the real address is found in the reverse mapping, then the process records the association between the peer and alias addresses in the list for future use (2715), and then returns the real address (2716).

Figure 28:
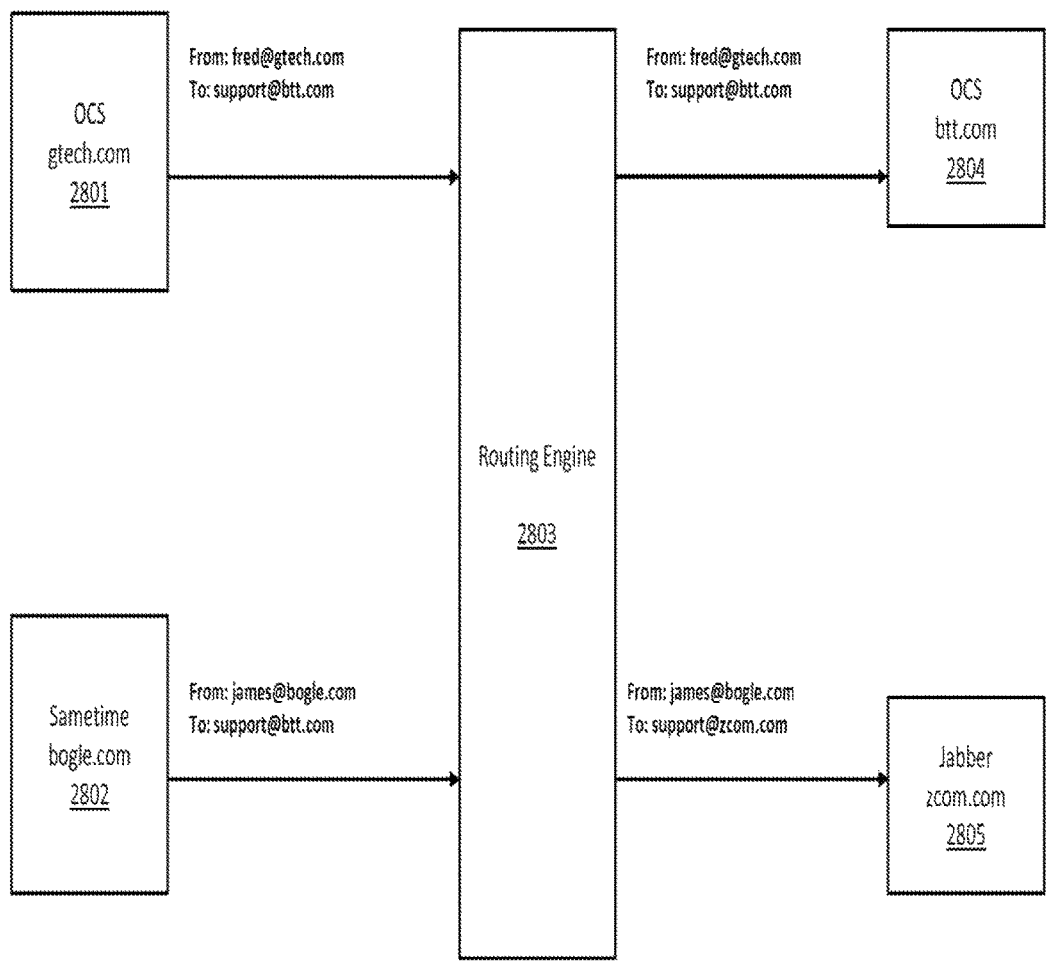
FIG. 28 illustrates an exemplary reverse aliasing message process for use with the present system, according to one embodiment.

FIG. 28 illustrates an exemplary reverse aliasing message process for use with the present system, according to one embodiment. FIG. 28 is best understood by considering an example including two fictional companies BTT(btt.com) and ZCom(zcom.com) that merged recently. Before the merger BTT(btt.com) (2804) was servicing customers from GTech (gtech.com) (2801) with the support address support@btt.com. ZCom(zcom.com) (2805) was servicing customers from Bogle(bogle.com) (2802) with the support address support@zcom.com After the merger both the companies will be known to external organizations as BTT (btt.com) but internally they still have both domains btt.com and zcom.com. This is achieved using an exemplary routing engine (2803) described herein. At the same time they would like to have one support alias support@btt.com. If customers from GTech(gtech.com) use the support@bit.com alias they will continue to talk to the same person/group managing support@btt.com. If customers from Bogle(bogle.com) use the support@btt.com alias they talk to the entity managing support@zcom.com.

Figure 29A:
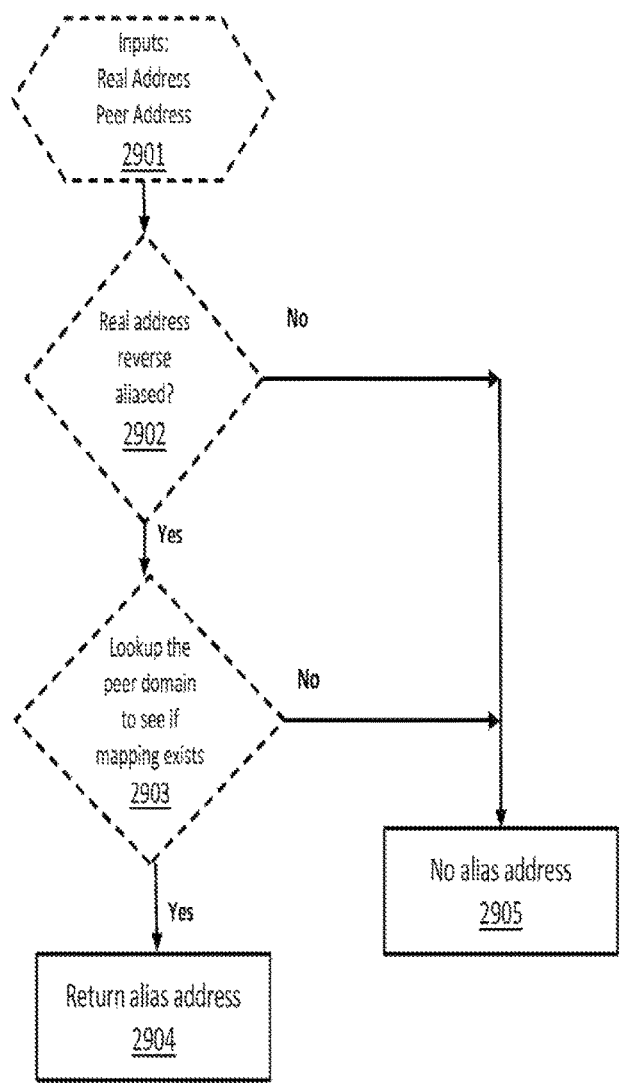
FIGS. 29A and 29B illustrate exemplary reverse aliasing plug-in processes for use with the present system, according to one embodiment.
Figure 29B:
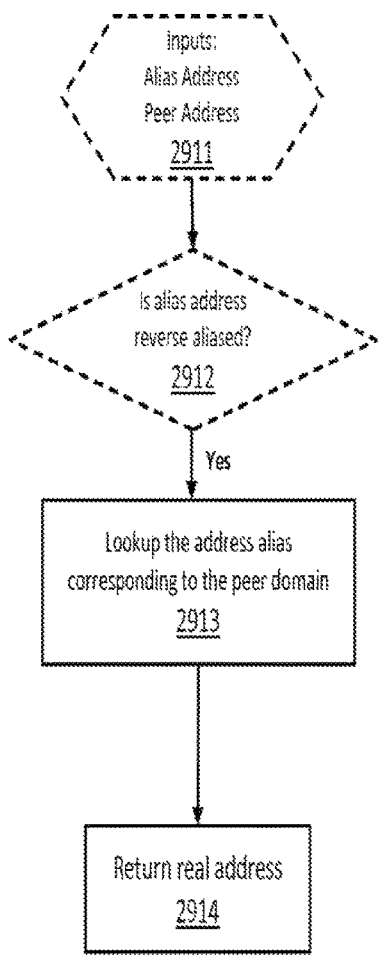

FIGS. 29A and 29B illustrate exemplary reverse aliasing plug-in processes for use with the present system, according to one embodiment. In FIG. 29A, an alias address is computed from a real address. Upon receiving a real address and a peer address as inputs (2901), the process determines if reverse address aliasing is supported (2902) i.e. enabled. If not, there is no alias address and the real address is returned (2905). If reverse aliasing is supported, then the process looks up the peer domain to determine if a mapping exists (2903). If so then the alias address is returned (2904). If not there is no alias and the real address is returned (2905).

In FIG. 29B, a real address is computed from an alias address. Upon receiving an alias address and a peer address as inputs (2911), the process determines if the alias address is reverse aliased (2912). If not then the alias address is returned as the real address (2914). If the alias address is reversed aliased, then the process looks up the alias address corresponding to the peer domain (2913) and the real address is returned (2914).

Figure 30:
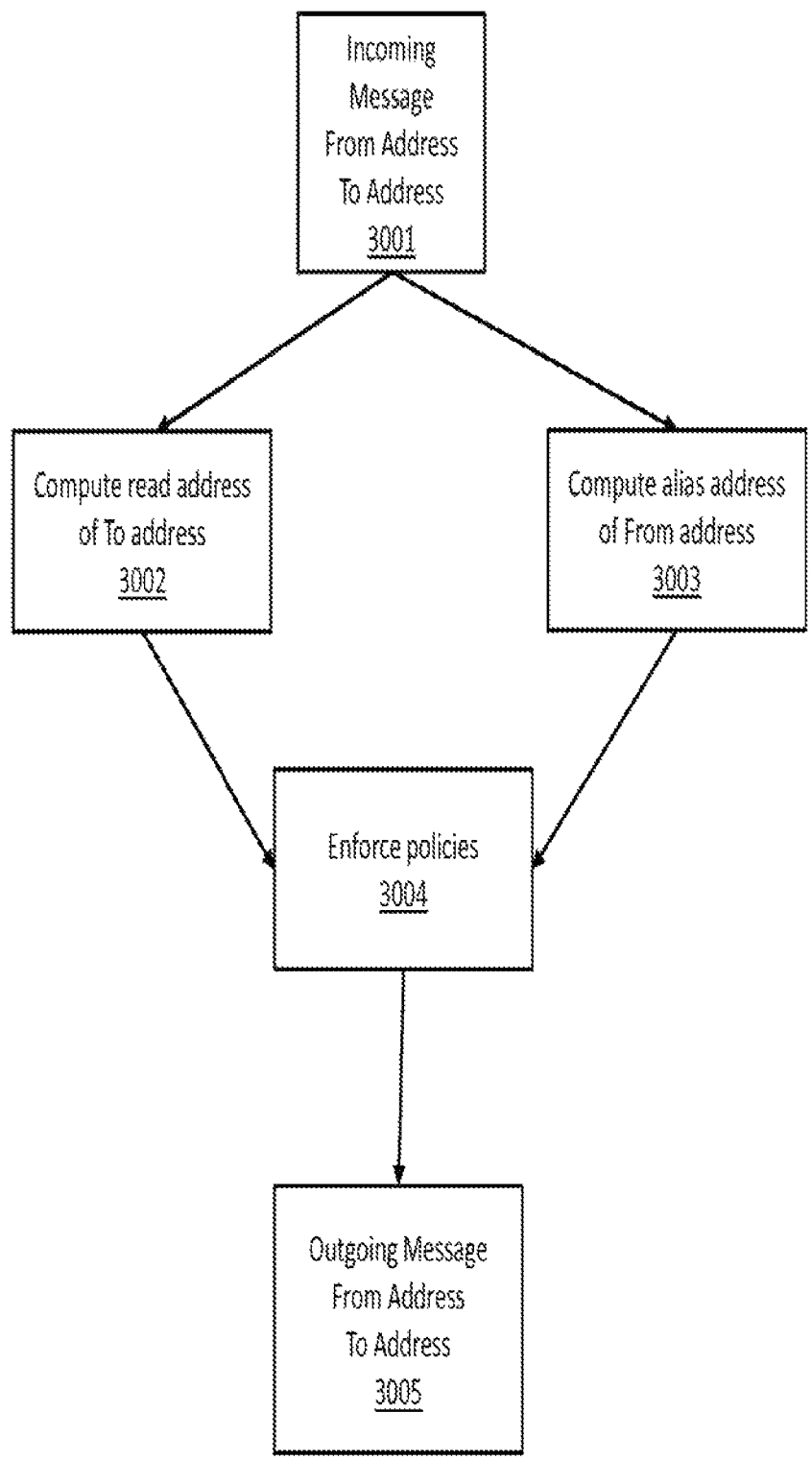
FIG. 30 illustrates an exemplary advanced alias domain routing process for use with the present system, according to one embodiment.

FIG. 30 illustrates an exemplary advanced alias domain routing process for use with the present system, according to one embodiment. According to one embodiment, every incoming message from a UC has a "from" address (source address) and a "to" address (destination address). The "from" address is always and the "to" address could be an alias. An incoming message is received as input, including a "from" address and a "to" address 3001. The real address of the "to" address is computed 3002, and the alias address of the "from" address is computed 3003. When the real address of the "to" address is computed, the "to" address is changed from alias to real where applicable. Policies are enforced 3004, and policies are always enforced on messages containing real addresses. Finally an outgoing message is generated including a "from" address and a "to" address 3005. The from address is changed to the computed alias address, and the "to" address is a real address in order for the message to be processed correctly by the receiving UC.

A method and system for advanced alias domain routing are disclosed. Although various embodiments have been described with respect to specific examples and subsystems, it will be apparent to those of ordinary skill in the art that the concepts disclosed herein are not limited to these specific examples or subsystems but, extends to other embodiments as well. Included within the scope of these concepts are all of these other embodiments as specified in the claims that follow.

Each of the features and teachings disclosed herein can be utilized separately or in conjunction with other features and teachings to provide a method for reducing the order of system models exploiting sparsity. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

We claim:

1. A computer-implemented method, comprising:
    receiving an incoming message from a first unified communications server, the incoming message comprising source address data, destination address data, and digital content;
    computing a real address of a destination address by using the source address data;
    computing an alias address of a source address by using the destination address data;
    detecting the incoming message;
    translating the incoming message into an internal memory representation of the incoming message (IMRM);
    determining whether the IMRM is allowed;
    if the IMRM is allowed, extracting from the IMRM a destination format of a second unified communications server;
    generating, using the destination format of the second unified communications server, an outgoing message comprising the digital content, the real address and the alias address; and
    transmitting the outgoing message to the second unified communications server.

2. The computer-implemented method of claim 1, wherein computing the real address comprises:
    determining that the destination address data includes an alias destination address by using a domain of the source address data;
    retrieving a real destination address by using the source address and the a destination address; and
    replacing the destination address data with the real destination address.

3. The computer-implemented method of claim 1, wherein computing the alias address comprises:
    retrieving an alias source address by using the destination address and the real source address; and
    replacing the source address data with the alias source address.

4. The computer-implemented method of claim 1 wherein the digital content is one or more of a voice message, a video message, an instant message, or an email message.

5. The computer-implemented method of claim 1, wherein the first unified communications server and second unified communications server are a single unified communications server.

6. A system, comprising:
    a federation server in communication with a network and a database; and
    software instructions executable by the federation server, the software instructions causing the federation server to perform receiving an incoming message from a first unified communications server, the incoming message comprising source address data, destination address data, and digital content; computing a real address of a destination address by using the source address data;
    computing an alias address of a source address by using the destination address data;
    detecting the incoming message;
    translating the incoming message into an internal memory representation of the incoming message (IMRM);
    determining whether the IMRM is allowed;
    if the IMRM is allowed, extracting from the IMRM a destination format of a second unified communications server;
    generating, using the destination format of the second unified communications server, an outgoing message comprising the digital content, the real address and the alias address; and
    transmitting the outgoing message to the second unified communications server.

7. The system of claim 6, wherein computing the real address comprises:
    determining that the destination address data includes an alias destination address by using a domain of the source address data; retrieving a real destination address by using the source address and the alias destination address; and
    replacing the destination address data with the real destination address.

8. The system of claim 6, wherein computing the alias address comprises:
    retrieving an alias source address by using the destination address and the real source address; and
    replacing the source address data with the alias source address.

9. The system of claim 6, wherein the digital content is one or more of a voice message, a video message, an instant message, and an email message.

10. A non-transitory computer readable medium having stored thereon a plurality of instructions, the instructions when executed by a processor, cause the processor to perform:

receiving an incoming message from a first unified communications server, the incoming message comprising source address data, destination address data, and digital content;

computing a real address of a destination address by using the source address data;

computing an alias address of a source address by using the destination address data;

detecting the incoming message;

translating the incoming message into an internal memory representation of the incoming message (IMRM);

determining whether the IMRM is allowed;

if the IMRM is allowed, extracting from the IMRM a destination format of a second unified communications server;

generating, using the destination format of the second unified communications server, an outgoing message comprising the digital content, the real address and the alias address; and transmitting the outgoing message to the second unified communications server.

11. The computer-readable medium of claim 10, wherein computing the real address comprises:

determining that the destination address data includes an alias destination address by using a domain of the source address data;

retrieving a real destination address by using the source address and the a destination address; and replacing the destination address data with the real destination address.

12. The computer-readable medium of claim 10, wherein computing the alias address comprises:

retrieving an alias source address by using the destination address and the real source address; and replacing the source address data with the alias source address.

13. The computer-readable medium of claim 10, wherein the digital content is one or more of a voice message, a video message, an instant message, and an email message.

* * * * *